(12) United States Patent
Soga et al.

(10) Patent No.: US 6,427,326 B1
(45) Date of Patent: Aug. 6, 2002

(54) METHOD OF MANUFACTURING CONNECTING ROD

(75) Inventors: Ryuji Soga, Saitama-ken; Shuichi Yamane, Tokyo; Hiroshi Sugita, Tochigi-ken; Tadatomo Hatayama, Tochighi-ken; Yousuke Yamazaki, Tochigi-ken; Takashi Asada, Saitama-ken; Kimio Momose, Tochigi-ken; Yoshiro Akiyama, Saitama-ken; Seiichi Akimoto, Saitama-ken; Takashi Kihara, Saitama-ken, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/584,387

(22) Filed: Jun. 1, 2000

(30) Foreign Application Priority Data

| Jun. 17, 1999 | (JP) | ............................................ | 11-171108 |
| Jun. 17, 1999 | (JP) | ............................................ | 11-171109 |
| Aug. 6, 1999 | (JP) | ............................................ | 11-224278 |
| Aug. 6, 1999 | (JP) | ............................................ | 11-224279 |

(51) Int. Cl.$^7$ .............................................. B21D 53/84
(52) U.S. Cl. .............................. 29/888.092; 29/888.09; 72/328; 72/334; 72/353.2; 72/354.6; 72/453.02
(58) Field of Search ...................... 29/888.09, 888.092; 74/579 R, 579 E; 72/327, 328, 334, 356, 353.2, 354.6, 453.02

(56) References Cited

U.S. PATENT DOCUMENTS

| 3,064,507 | A | * | 11/1962 | Strugala et al. | |
| 4,977,773 | A | * | 12/1990 | Mito et al. | ................. 72/353.6 |
| 5,218,853 | A | * | 6/1993 | Mueller et al. | ............... 72/325 |
| 5,507,093 | A | * | 4/1996 | Wittenstein et al. | ..... 29/888.09 |
| 5,823,104 | A | * | 10/1998 | Beisel et al. | |
| 6,125,536 | A | * | 10/2000 | Spurny | .................... 29/888.09 |

FOREIGN PATENT DOCUMENTS

| JP | 59-39439 | | 3/1984 |
| JP | 59-078743 | * | 5/1984 |
| JP | 59-082140 | * | 5/1984 |
| JP | 59-133928 | * | 8/1984 |
| JP | 59-197336 | * | 11/1984 |
| JP | 60-102246 | * | 6/1985 |
| JP | 61-137640 | * | 6/1986 |
| JP | 62-240123 | * | 10/1987 |
| JP | 63-195408 | | 8/1988 |
| JP | 10-147837 | | 6/1998 |

* cited by examiner

Primary Examiner—S. Thomas Hughes
Assistant Examiner—Eric Compton
(74) Attorney, Agent, or Firm—Armstrong, Westerman & Hattori, LLP

(57) ABSTRACT

A connecting rod is formed by cold forging in a single pressing cycle at a good accuracy without separately preparing a large-end cap, to thereby reduce the manufacturing cost. A double-action type of forging apparatus is made up of an upper die, a lower die, and a large-end portion punch and a small-end portion punch, both being movably provided in each of the dies. The upper die is closed to the lower die while forging a preform, to thereby roughly form a connecting rod. Then, the large-end portion punch and the small-end portion punch are protruded into a forming space between both the upper and lower dies to forge the parts to be pierced, thereby filling underfilled parts with material. Then, the large-end portion punch and the small-end portion punch on the side of the upper die are pushed out of the forming space to reach the lower die. The underfills left in the parts to be pierced are blanked or punched away to form a large-end hole and a small-end hole.

7 Claims, 19 Drawing Sheets a

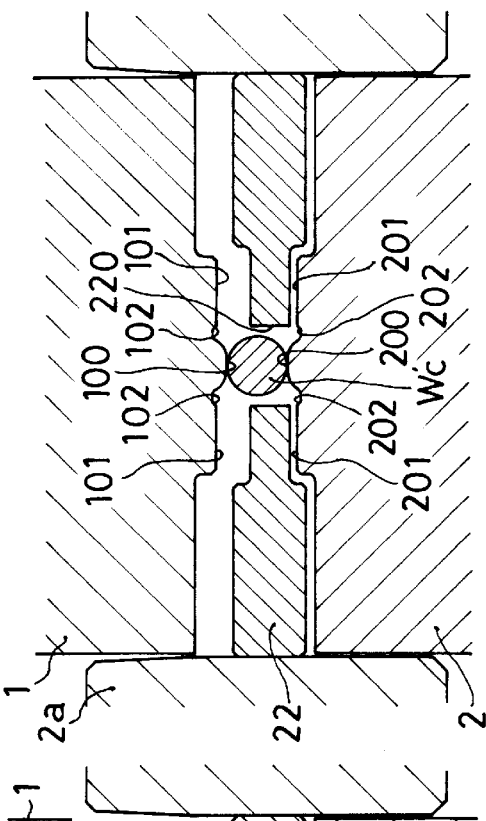
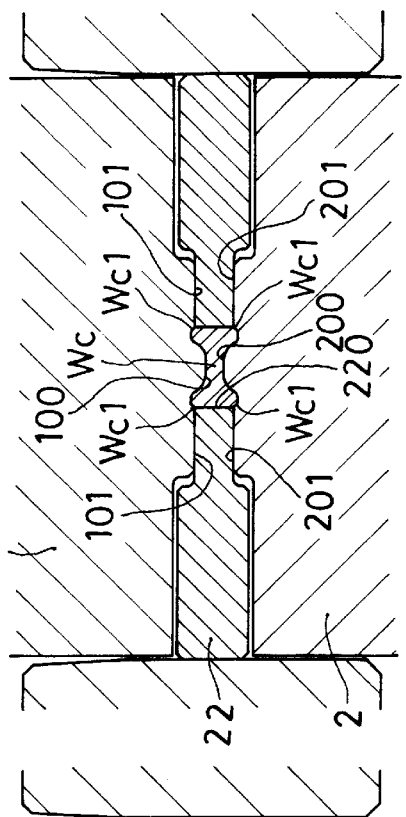
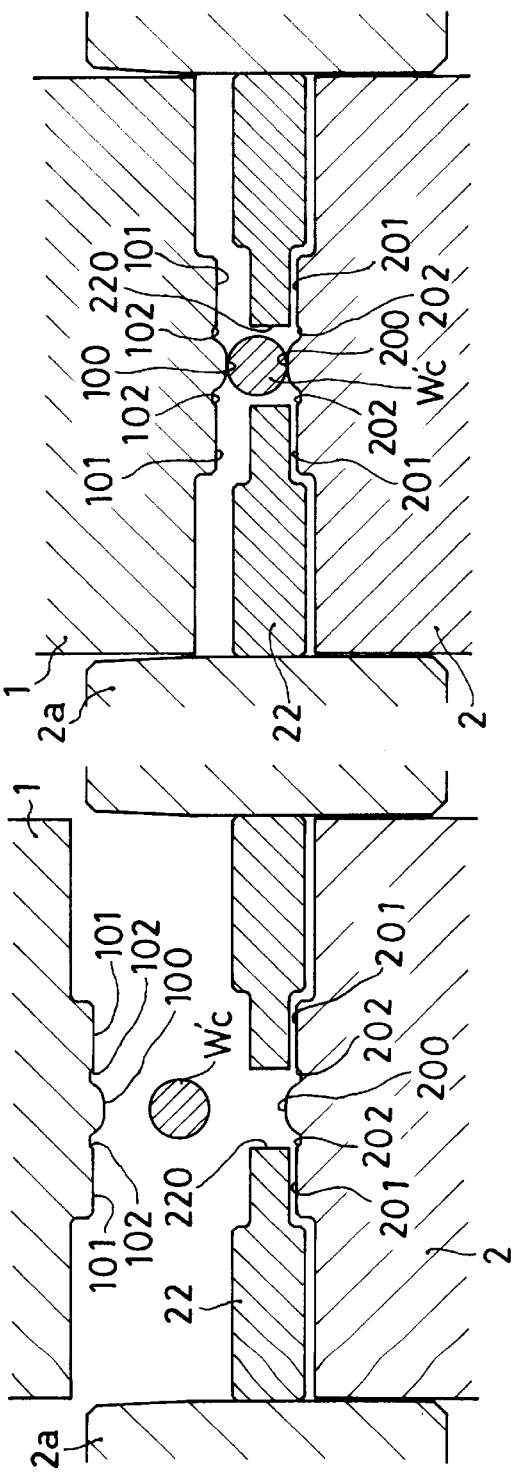
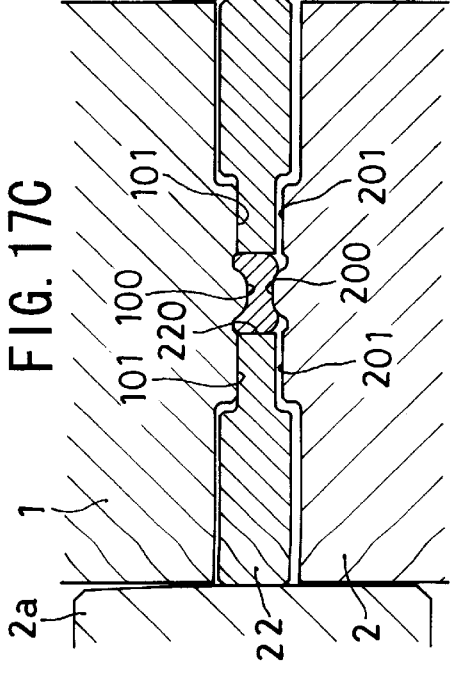

METHOD OF MANUFACTURING CONNECTING ROD

BACKGROUND OF THE INVENTION

1. Field of the Invention

The present invention relates to a method of manufacturing a connecting rod which connects a piston and a crank shaft together in an engine.

2. Description of Related Art

A connecting rod for an engine has a large-end portion into which is inserted a crank pin which is formed in a crank shaft, a small-end portion into which is inserted a piston pin to be mounted on a piston, and a rod portion which lies between the large-end portion and the small-end portion. A rod main body which is made up by integrally forming the small-end portion, the rod portion, and that half part of the large-end portion which is on the side of the rod portion is connected to a large-end cap which forms the remaining half part of the large-end portion, whereby a connecting rod is assembled.

As a conventional method of manufacturing a connecting rod, there is known the following. Namely, a connecting rod blank which has a large-end potion, a small-end portion, and a rod portion between the small-end and the large-end portion and which is shaped into an integral combination of the rod main body and the large-end cap is manufactured by casting. The connecting rod blank is then divided into the rod main body and the large-end cap (see Japanese Published Unexamined Patent Application No. 195408/1988). However, the connecting rod manufactured by casting has a tendency of being insufficient in strength. As a solution, in a connecting rod in which a high strength is required, the rod main body and the large-end cap are ordinarily manufactured separately by forging. In this conventional method, however, the control of accuracy in the connecting or coupling surfaces of the rod main body and the large-end cap becomes troublesome and a cost reduction becomes difficult.

In Japanese Published Unexamined Patent Application No. 39439/1984, the following method is known. Namely, at the time of cold-coining a forged product which is manufactured by hot-striking, excess metal which is left in a portion to be pierced with a hole is punched out to thereby form a pierced product. It is considered to form the following connecting rod blank by utilizing this art. Namely, a connecting rod blank which has not formed therein holes for the large-end portion and a small-end portion is hot-forged. Then, at the time of cold-coining, a hole is punched in the large-end portion and the small-end portion, respectively, to thereby form a connecting rod blank.

In this method, however, the forming of the entire shape of the connecting rod blank is performed in a hot treatment. Therefore, the step of removing the scales which occur at the time of hot-forging is required and, further, a heating apparatus become necessary. As a result, the cost of manufacturing the connecting rod cannot be reduced to a large extent.

The applicants of this application have earlier proposed the following cold-forged steel in Japanese Patent Application No. 303400/1996. Namely, the steel in question contains in percent by weight (wt %) the following component composition, i.e., 0.05–0.25% of carbon (C), 0.35–0.60% of silica (Si), 0.20–1.30% of manganese (Mn), 0.15–0.60% of chromium (Cr), and further contains one or more selected from the group consisting of 0.030–0.100% of sulfur (S), 0.005–0.040% of tellurium (Te), 0.03–0.30% of lead (Pb), 0.03–0.20% of bismuth (Bi), 0.0005–0.0050% of calcium (Ca), the remaining part being iron (Fe), and also meets the following equations $$19 \leq 85(\%C)+9(\%Si)+3(\%Mn)+5(\%Cr) \leq 25 \quad (1)$$

$$100(\%C)+3(\%Si)+3(\%Mn)-9(\%Cr)+100(\%S)-20(\%Te) \leq 23 \quad (2)$$

This steel is superior in the workability in cold forging and in fatigue strength, so that it is suitable for forming mechanical parts by cold forging.

In view of the above points, the present invention has an object of providing a method of manufacturing a connecting rod in which the connecting rod blank which is shaped into an integral combination of a rod main body and a large-end cap is cold-forged in a single pressing cycle to thereby largely reduce the cost of manufacturing the connecting rod.

SUMMARY OF THE INVENTION

In order to attain the above and other objects, the present invention is a method of manufacturing a connecting rod for an engine, the connecting rod comprising a rod main body and a large-end cap. The method comprises the steps of: forming, by cold forging, a connecting rod blank which is shaped into an integral combination of a rod main body and a large-end cap and which has a large-end portion, a small-end portion, and a rod portion therebetween; and splitting the connecting rod blank into the rod main body and the large-end cap. The step of forming the connecting rod blank is performed by a double-action type of forging apparatus comprising: an upper die which is movable up and down; a lower die; a large-end portion punch which is respectively provided in each of the dies so as to be movable therethrough and to lie opposite to each other at a portion to pierce the large-end portion of the connecting rod blank; and a small-end portion punch which is respectively provided in each of the dies so as to be movable therethrough and so as to lie opposite to each other at a portion to pierce the small-end portion of the connecting rod blank. The step of forming the connecting rod blank comprises: a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the preform into the shape of the connecting rod blank; a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced. The first and second forging steps as well as the piercing step are carried out in a single pressing cycle.

According to this invention, the connecting rod blank is split into the rod main body and the large-end cap after the connecting rod blank has been formed. Therefore, special control of accuracy in the connecting surfaces of the rod main body and the large-end cap is not required any more, with the result that the cost of manufacturing the connecting rod becomes smaller. Further, those parts of the large-end portion and the small-end portion which are to be pierced or punched with a hole, respectively, are forged with the large-end portion punch and the small-end portion punch, respectively, in the second forging step. In this manner, it becomes possible to push the material of the preform into underfills (or underfilled parts) which are likely to occur in the cold forging, to thereby fill the underfills with the material. The accuracy in shape of the connecting rod can thus be secured. Thereafter, the pads left in the parts to be pierced is finally punched out by the large-end portion punch and the small-end portion punch which are provided in one of the upper and lower dies. It is thus possible to form by cold forging the connecting rod blank in one pressing cycle with a good accuracy. This results in a large reduction in the cost of manufacturing the connecting rod.

That part of the connecting rod blank which corresponds to the large-end cap is split or divided after the connecting rod blank has been formed. In this case, it is preferable to use, as a large-end portion punch provided in one of the dies, a punch having those projections on an outer periphery of the punch which coincide with split surfaces of the rod main body and the large-end cap of the connecting rod. It is then possible to form, in the piercing step, splitting notches on an inner periphery of a hole in the large-end portion. It is thus not necessary to form the splitting notches in a subsequent processing step, resulting in a further reduction in the manufacturing cost.

In the above-described piercing step, if an oil chamber which forces those large-end portion punch and the small-end portion punch which are provided in the other of the dies toward the forming space is opened to the atmosphere so that each of the punches is pushed out of the forming space in a load-free state, cracks sometimes occur to the hole part of the connecting rod blank. The occurrence of cracks is particularly evident in that part of the peripheral wall of the hole of the small-end portion which is closer to the edge as seen in the direction of punching out the pads. In order to prevent the occurrence of this kind of cracks, preferably the piercing step is performed in a state of applying a load to the large-end portion punch and the small-end portion punch provided on the other of the dies in a direction to resist the pushing of the punches out of the forming space.

In the method as described in the above-described Japanese Published Unexamined Patent Application No. 195408/1988, the following steps are employed. Namely, the connecting rod blank has been forged, the connecting rod blank is split into the rod main body and the large-end cap in a state in which the connecting rod blank is subjected to a cold-temperature or cryogenic treatment. In this invention, it is also considered to split the connecting rod blank in a similar manner after the connecting rod blank has been formed in cold forging. According to this method, due to the cryogenic treatment, the connecting rod blank is fractured or broken through brittleness by a relatively small load, whereby the connecting rod blank is split into the rod main body and the large-end cap. The split surfaces of the rod main body and the large-end cap are brittleness-fractured surfaces, having projections and recessions. By the engagement of these projections and recessions, the accuracy of connecting or assembling of the rod main body and the large-end cap can be secured. However, there will sometimes be formed minute projections which are superimposed on the above-described projections and recessions. When the large-end cap is connected to the rod main body, the minute projections are broken to thereby get included into the space between the split surfaces of the rod main body and the large-end cap. As a result, it sometimes becomes impossible to accurately connect the large-end cap to the rod main body. In such a case, it is preferable to brush the split surfaces of the rod main body and the large-end cap after the splitting. The minute projections on the split surfaces can thus be removed. As a result, the accuracy of assembling the rod main body and the large-end cap can be prevented from becoming poor due to the inclusion of the minute projections into the split surfaces. It is considered to perform the brushing right after splitting the connecting rod blank. However, right after the splitting, the split surfaces are so low in temperature that the vapor in the atmosphere gets adhered thereto by freezing. The minute projections cannot therefore be successfully removed. It is therefore preferable to perform the brushing after the connecting rod blank has been returned to the ambient temperature after splitting.

Further, it is preferable to form, before splitting the connecting rod blank, in the connecting rod blank a connecting hole made up of a threaded hole on a side of the rod main body and a bolt inserting hole which extends from the threaded hole toward the large-end cap and into which is inserted a bolt for connecting the large-end cap. In this case, if the bolt inserting hole is formed larger in diameter than the outer diameter of a tap to be used in tapping of the bolt hole, i.e., larger in diameter than the root diameter of the threaded hole, the play of the bolt relative to the bolt inserting hole becomes large. As a result, the large-end cap is sometimes fastened to the rod main body in a state in which the projections and recessions on the split surface of the large-end cap are engaged with the projections and recessions which are different from those on the split surface of the rod main body. On the other hand, if the bolt inserting hole is formed into a stepped hole having a large-diameter part near an outer end of the large-end cap and a small-diameter part which extends from the large-diameter portion through a stepped part toward the threaded hole, and the diameter of the small-diameter portion is made larger than an outer diameter of the connecting bolt and smaller than a root diameter of the threaded hole, the projections and recessions on the surface of the large-end cap are prevented from deviating to the position facing the projections and recessions that are different from those on the split surface of the rod main body. In this manner, the rod main body can be connected to the rod main body in a state in which the projections and recessions on the split surface of the large-end cap are engaged with the corresponding projections and recessions on the split surface of the rod main body. The accuracy of assembling of the rod main body and the large-end cap can thus be secured.

As the double-action type of forging apparatus, it is preferable to use the one which comprises: an upper die holder for the upper die; a lower die holder for the lower die; a hollow first piston which is inserted into the upper die holder and to which is connected the upper die; a second piston which is inserted into the first piston and to which are connected those large-end portion punch and the small-end portion punch which are provided so as to be movable through the upper die; a third piston which is inserted into the lower die and to which are connected those large-end portion punch and the small-end portion punch which are provided so as to be movable through the lower die; that first oil chamber inside the upper die holder which receives through the first piston a reaction force of closing the upper die toward the lower die; that second oil chamber inside the first piston which is defined between the second piston and a pressure receiving wall on an upper end of the first piston facing the first oil chamber; that air chamber inside the first piston which lie opposite to the second oil chamber with the second piston therebetween; a communicating hole which is formed in the pressure receiving wall and which communicates the first oil chamber and the second oil chamber; that third oil chamber inside the lower die holder which forces the third piston upward; a first joint which is provided in the first piston and which communicates with the second oil chamber; a second joint which is provided in the lower die and which communicates with the third oil chamber and which, at a time of completion of the first forging step, couples with the first joint to bring the second oil chamber and the third oil chamber into communication with each other; and a valve which shuts off the communication between the second oil chamber and the first joint when the downward stroke of the second piston relative to the first piston has exceeded a predetermined value at which the second forging step is completed; wherein the communicating hole is blocked by forcing the second piston against the pressure receiving wall by an air pressure of the air chamber until the first forging step is completed and, after completion of the first forging step, the air chamber is discharged to thereby release the blocking of the communicating hole by the second piston and, after completion of the second forging step, oil is discharged from the third oil chamber.

According to this arrangement, while the communicating hole is blocked by the second piston, that portion of the second piston which receives the oil pressure of the first oil chamber is limited to the portion of the communicating hole. Even if the oil pressure in the first oil chamber increases to the oil pressure corresponding to the load at the time of completion of the first forging step, the second piston can be maintained, by a relatively low air pressure in the air chamber, to the retreated position in which the second piston contacts the pressure receiving wall. Here, as an air pressure source, there can be used an air source which is available inside a plant in which the double-action type of forging apparatus is installed. Therefore, the air source is made available at a low cost.

After the completion of the first forging step, the air is discharged from the air chamber to thereby release the blocking of the communicating hole. Then, oil flows from the first oil chamber into the second oil chamber through the communicating hole. Further, in this state, since the first and second joints are connected together, the oil flows from the second oil chamber also into the third oil chamber through both the joints. By the oil pressures in the second and third oil chambers which operate on the second and third pistons, respectively, each of the punches which are movably provided in the upper and lower dies respectively is pushed into the forming space to thereby perform the second forging step. Then, since a closed oil circuit to communicate the second and third oil chambers together is formed as a result of connection of the first and second joints, it is not necessary to use flexible tubes as the piping material for the closed circuit. The durability can thus be secured.

In a state in which the second forging step has been completed, the communication of the third oil chamber to the second oil chamber is shut off by the valve. Thereafter, by discharging the oil from the third oil chamber, the pushing of the large-end portion punch and the small-end portion punch on the side of the lower die by the oil pressure in the third oil chamber is released. Thus, only the large-end portion punch and the small-end portion punch on the side of the upper die are pushed by the oil pressure in the second oil chamber. In this manner, while pushing the large-end portion punch and the small-end portion punch on the side of the lower die out of the forming space, the large-end portion punch and the small-end portion punch on the side of the upper die are further forced into the forming space, whereby the large-end portion and the small-end portion are pierced or punched with hole, respectively.

It is also possible to close the upper die by moving the upper die holder in interlocking relationship with the press ram. In this case, however, the forging load is limited to the pressing force of the press ram. On the other hand, if a ram piston which moves in interlocking relationship with the press ram is inserted into, or disposed in, the inside of the upper die holder to thereby define the first oil chamber between the ram piston and the first piston, the forging load can be made larger than the pressing force of the press ram, because the diameter of the first piston is made larger than that of the ram piston.

It is considered to form in the lower die a forming hole of the shape which coincides with the contour of the connecting rod blank. In this case, however, the machining work of the lower die becomes troublesome and the cost of the die becomes expensive. It is therefore desirable to make the following arrangement. Namely, on top of the lower die is disposed an intermediate die which is provided with a forming hole of a shape which coincides with the contour of the connecting rod blank. Upon completion of the first forging step, the closed forming space is constituted by the forming hole between the upper die and the lower die. Here, in the intermediate die, there is operated a force, by the forging of the preform, in the first forging step and in the second forging step. The force tries to expand the forming hole in the width direction and in the longitudinal direction. Stresses are likely to concentrate in the periphery of the forming hole, at the following parts or portions, namely, a) on parts coinciding with both side edges on that end of the large-end portion of the connecting rod which lies opposite to the rod portion thereof, b) on parts coinciding with the periphery on both sides having the largest width in the small-end portion of the connecting rod, and c) on a part coinciding with that apex portion of the small-end portion of the connecting rod which lies opposite to the rod portion. Cracks starting from each of the above-described parts a)–c) are thus likely to occur in the intermediate die. In such a case, if the intermediate die comprises: a first segmented die constituting that peripheral part of the forming hole which coincides with such an end in the large-end portion of the connecting rod blank as is opposite to the rod portion of the connecting rod blank; a pair of second segmented dies each constituting that peripheral part of the forming hole which coincides with a section starting from an edge part on each side of the end to a peripheral part on each side of the largest width in the small-end portion of the connecting rod blank; a pair of third segmented dies constituting that peripheral part of the forming hole which coincides with a section from a peripheral part on each side of the largest width to that apex part of the small-end portion of the connecting rod blank which is opposite to the rod portion. Then, the occurrence of cracks due to stress concentration can be prevented and the lifetime of the dies can be prolonged. Further, in order to be sure that no clearance occurs to the divided surface of each of the segmented dies by the expanding force which operates at the time of forging of the preform, the above segmented dies are preferably tightened together by a ring member so that the segmented dies are brought into forcible contact with each other at respective split surfaces. The occurrence of burrs can thus be prevented. In particular, the segmented surfaces of the first segmented dies and each of the second segmented dies as well as the segmented surfaces of the second segmented dies and the third segmented dies are preferably formed such that an angle between a central surface in the widthwise center of the forming hole and each of the segmented surfaces is 45°. Then, the first through the third segmented dies can advantageously be forcibly pressed against each other by the tightening force from the outer periphery of the ring member.

It is considered to form in each of the upper and lower dies a forming part of projected shape which fits into the forming hole in the intermediate die so that the preform is forged inside the forming hole by this forming part. However, this arrangement has the following disadvantage. Namely, the four corner portions in cross section of the rod portion of the connecting rod blank are formed into the shape of edges, with the result that concentrated stresses are likely to occur. Therefore, the chamfering of the corner portions must be performed in a subsequent step. If an inclined projected edge is formed in the outer periphery of the forming part of each of the upper and lower dies, the corner portion can be formed into a chamfered shape. However, the rigidity of the projected edges cannot be secured and the durability of the dies becomes poor. This solution is therefore not practical. In such a case, preferably, the double action type of forging apparatus comprises: an intermediate die having a forming hole which constitutes a forming space enclosed by the upper die and the lower die upon completion of the first forging step, the forming hole having a hole portion for forming a contour of at least the rod portion, among the contours which are parallel in the direction in which the upper and lower dies face each other; the upper and lower dies each having formed therein: a forming surface including a rod-portion forming-section to form the side surfaces opposing the upper and lower dies; a face surface opposing the intermediate die; and an inclined surface on an outer edge portion of the rod-portion forming-section which chamfers each of the corner portions in cross section of the rod portion. By the inclined surface in the outer edges of the rod-portion forming-section of each of the upper and the lower dies, each corner portion of the rod portion of the connecting rod blank is formed into a chamfered shape. The chamfering work in a subsequent step is not necessary. Here, since there is present the face surface outside the inclined surface, the rigidity of the inclined portion can be sufficiently secured. The durability of the dies will therefore not be lowered. At the time of forging, the preform deforms first at the forging portion by the upper die, and the metal is protruded into the clearance between the face surface of the upper die and the intermediate die, with the result that burrs are likely to occur. In such a case, preferably, the intermediate die is supported through urging means in a manner floated from the face surface of the lower die such that, when the upper die is closed to the lower die, the face surface of the upper die gets seated on the intermediate die, and that the intermediate die gets seated on the face surface of the lower die against the urging means. Then, before the metal protrudes into the clearance between the face surface of the upper die and the intermediate die, the face surface of the upper die gets seated onto the intermediate die. Burrs will thus not occur. Once the intermediate die has seated onto the face surface of the lower die, there is formed a closed space by the upper and lower dies and the intermediate die. The connecting rod blank can thus be formed with a good accuracy.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 17A through 17D are sectional views showing the forming steps of the rod portion of the connecting rod blank by the forging apparatus in FIG. 12;

DETAILED DESCRIPTION OF PREFERRED EMBODIMENTS

Figure 1A:
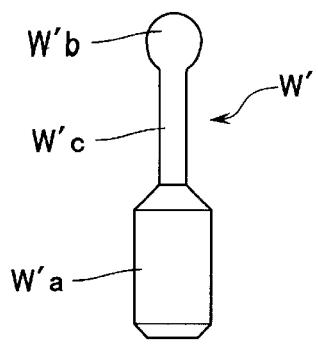
FIGS. 1A through 1H show the steps of manufacturing a connecting rod.
Figure 1B:
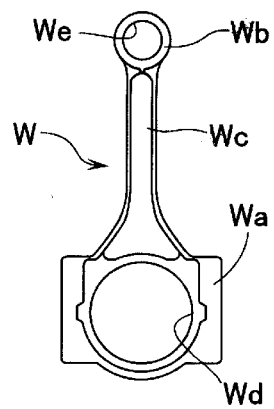
Figure 23:
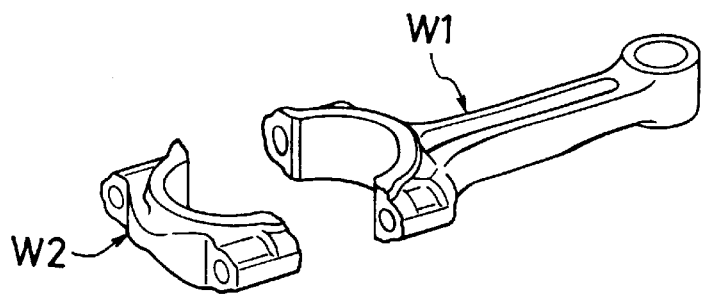
FIG. 23 is a perspective view of the rod main body and the large-end cap of the connecting rod.

FIGS. 1A through 1H show a process of manufacturing a connecting rod for use in an engine of an automobile. The connecting rod, as shown in FIG. 23, is made up of a rod main body W1 and a large-end cap W2. In manufacturing the connecting rod, a preform W', as shown in FIG. 1A, which is made of a cold-forging steel as proposed in the above-described Japanese Patent Application No. 303400/1996 is manufactured first. Then, a connecting rod blank W as shown in FIG. 1B is formed with this preform W' by means of cold forging. The connecting rod blank W is shaped into an integral combination of a large-end cap W2 and a rod main body W1 which has a large-end portion Wa, a small end portion Wb and a rod portion Wc between the large-end portion Wa and the small-end portion Wb. The large-end portion Wa and the small-end portion Wb have formed therein a hole Wd, We for inserting therethrough a crank pin and a piston pin, respectively. The preform W' is formed into a shape having a shaft portion W'c which corresponds to the rod portion Wc, that large-end mass portion W'a on one end of the rod portion W'c which corresponds to the large-end portion Wa, and that small-end mass portion W'b on the other end of the rod portion W'c which corresponds to the small-end portion Wb.

Figure 2:
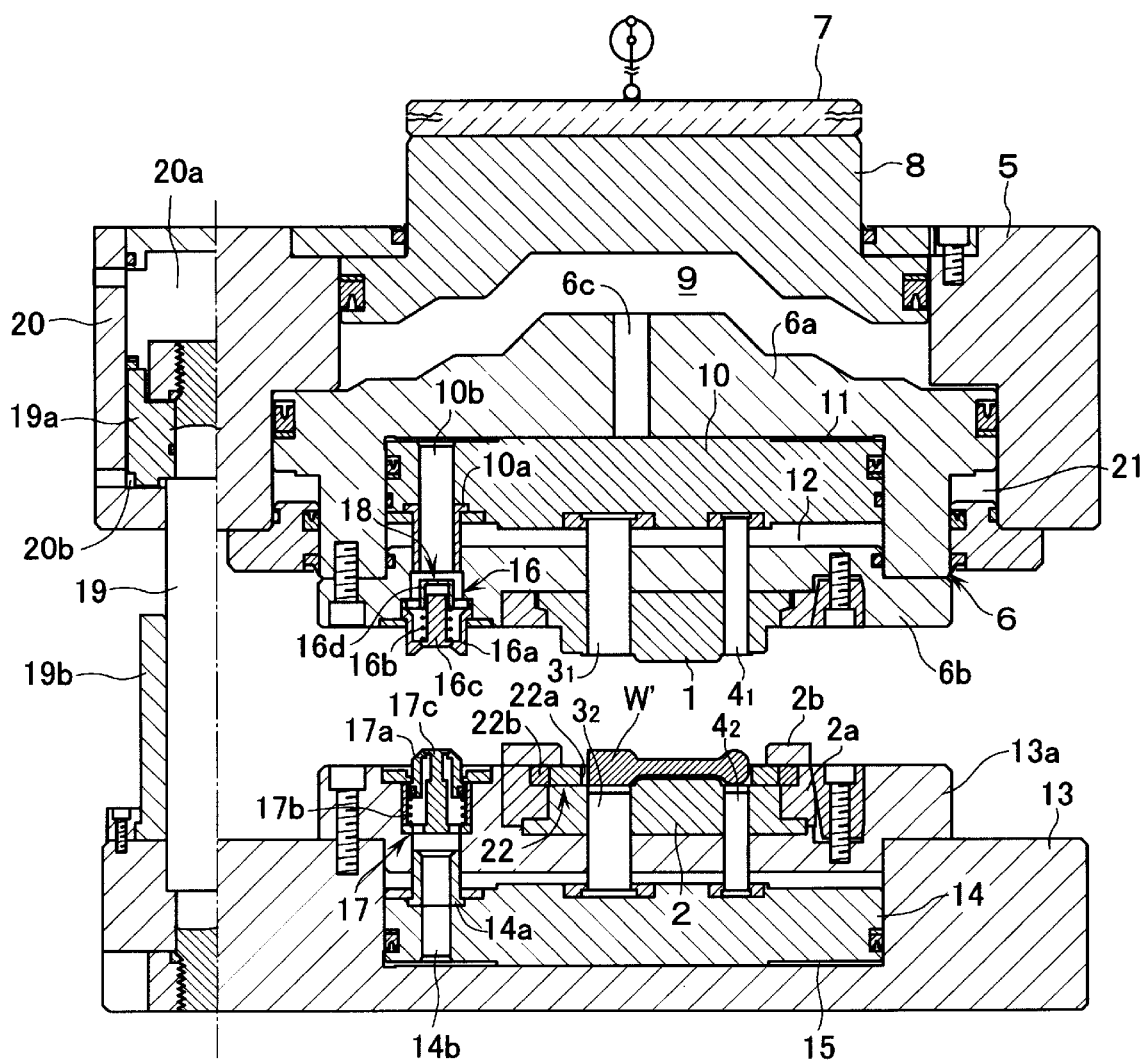
FIG. 2 is a vertical sectional view of one example of a double-action type of forging apparatus to be used in forming the connecting rod.

The connecting rod blank W is formed by using a double-action type of forging apparatus as shown in FIG. 2. This forging apparatus is made up of: an upper die 1 which is movable up and down; a lower die 2; a pair of upper and lower punches $3_1$, $3_2$ for the large-end portion Wa; and a pair of upper and lower punches $4_1$, $4_2$ for the small-end portion Wb. The upper and lower punches $3_1$, $3_2$ are provided in both the upper and lower dies 1, 2 in a manner to be movable therethrough at a position to face each other while sandwiching the large-end portion Wa to be pierced or punched with the hole Wd. The upper and lower punches $4_1$, $4_2$ are provided in both the upper and lower dies 1, 2 in a manner to be movable therethrough at a position to face each other while sandwiching the small-end portion Wb to be pierced with the hole We. (Note: For the purpose of simplicity, the punches $3_1$, $3_2$ for the large-end portion Wa are hereinafter called "large-end portion punch", and the punches $4_1$, $4_2$ for the small-end portion Wb are hereinafter called "small-end portion punch.")

The upper die 1 is mounted on a first piston 6 which is inserted into an upward upper die holder 5 in a manner to be movable up and down. In a position above the first piston 6, the die holder 5 has inserted thereinto a ram piston 8 which moves up and down in an interlocking manner with a press ram 7. A first oil chamber 9 is thus formed between the first piston 6 and the ram piston 8. The first piston 6 is formed larger in diameter than the ram piston so that the first piston 6 can be pushed down by a pressing force which is larger than the pressing force of the press ram 7.

The first piston 6 is formed into a hollow which has the upper end pressure receiving wall 6a which faces the first oil chamber 9 and a lower end cover plate 6b. The upper die 1 is attached to the lower end surface of the cover plate 6b. A second piston 10 which has connected thereto the large-end portion punch $3_1$ and the small-end portion punch $4_1$ is inserted into the first piston 6 so as to be movable up and down. There are thus defined inside the first piston 6 a second oil chamber 11 between the pressure receiving wall 6a and the second piston 10, and an air chamber 12 which lies on that lower side of the second piston 10 which is opposite to the second oil chamber 11. In addition, the pressure receiving wall 6a has formed therein a communicating hole 6c which communicates the first oil chamber 9 and the second oil chamber 11 together. It is thus so arranged that, when the second piston 10 is forced to the pressure receiving wall 6a, the communicating hole 6c is blocked by the second piston 10.

The lower die 2 is mounted on a base 13a which is on a downward lower die holder 13. A third piston 14 which has connected thereto the large-end portion punch $3_2$ and the small-end portion punch $4_2$ is inserted into the lower die holder 13 in a manner to be movable up and down. It is thus so arranged that the third piston 14 can be forced upward by the oil pressure inside a third oil chamber 15 which is formed inside the lower die holder 13.

The first piston 6 and the lower die holder 13 are respectively provided with a first joint 16 which communicates with the second oil chamber 11 and a second joint 17 which communicates with the third oil chamber 15. It is thus so arranged that, when the first piston 6 is lowered beyond a predetermined stroke, the first joint 16 and the second joint 17 are connected together, whereby the second oil chamber 11 and the third oil chamber 15 are brought into communication with each other. The first joint 16 is constituted by a downwardly extending sleeve 16a which is fixed to the cover plate 6b on the lower end of the first piston 6, and a valve body 16c which blocks an open end of the sleeve 16a and which is urged downward by a spring 16b. The second joint 17 is constituted by a sleeve 17a mounted on a base 13a which is on an upper end of the lower die holder 13 so as to be urged upward by a spring 17b, and a valve body 17c which blocks an open end of the sleeve 17a and which is fixed to the base 13a. When the first piston 6 is lowered beyond a predetermined stroke, the sleeve 16a of the first joint 16 comes into contact with the sleeve 17a of the second joint 17, whereby the sleeve 17a is pushed down. In addition, the valve body 17c of the second joint 17 comes into contact with the valve body 16c of the first joint 16, whereby the valve body 16c is pushed up. In this manner, both the joints 16, 17 are coupled together in a state in which the blocking of the open ends of the sleeves 16a, 17a is released.

Connecting passages between each of the second and third oil chambers 11, 15 and each of the joints 16, 17 may be formed so as to bypass each of the first and third pistons 10, 14. In this embodiment, however, the following arrangement has been employed. Namely, each of the pistons 10, 14 have mounted thereon connecting pipes 10a, 14a which are slidably fitted with the cover plate 6b and the base 13a, respectively. Each of the oil chambers 11, 15 is thus communicated with each of the joints 16, 17 through communicating holes 10b, 14b which are formed in each of the pistons 10, 14, and the connecting pipes 10a, 14a.

The connecting pipe 10a mounted on the second piston 10 is arranged to be fitted onto an outer circumference of a valve guide 16d for the valve body 16c which is mounted on the cover plate 6b. It is thus so arranged that, by the above described insertion onto the outer circumference, the communication between the second oil chamber 11 and the first joint 16 can be shut off. In other words, a valve 18 which shuts off the communication between the second oil chamber 11 and the first joint 16 is constituted by the communicating pipe 10a and the valve guide 16d.

The upper die holder 5 is provided with cylinder sections 20 which receive therein pistons 19a fixed to tie rods 19 vertically mounted on the lower die holder 13. (Note: In FIG. 2 and others, the cylinder section 20 and the tie rod 19 are respectively illustrated as only one in number. Actually, they are respectively provided in a plurality of numbers, the remaining ones being omitted in the figures for simplicity.) It is thus so arranged that, when an upper chamber 20*a* of each of the cylinder sections 20 receives an input of an oil pressure, the upper die holder 5 is pushed up and that, when a low chamber 20*b* of each of the cylinder sections 20 receives an input of the oil pressure, the upper die holder 5 is pushed down to a lower end position which is restrained by a stopper 19*b* on an outer circumference of each of the tie rods 19.

Inside the upper die holder 5, there is formed a fourth oil chamber 21 which faces a downward stepped surface formed in an intermediate portion of the first piston 6. It is thus so arranged that the first piston 6 is pushed up to the lifted end position by the input of the oil pressure into the fourth oil chamber 21.

The lower die 2 is provided with an intermediate die 22 which has formed therein a forming hole 22*a* which coincides with a contour of the connecting rod blank W. The intermediate die 22 is held in position on the lower die 2 by means of that guide ring 2*b* for the upper die 1 which is provided on a die ring 2*a* enclosing the lower die 2.

Figure 3:
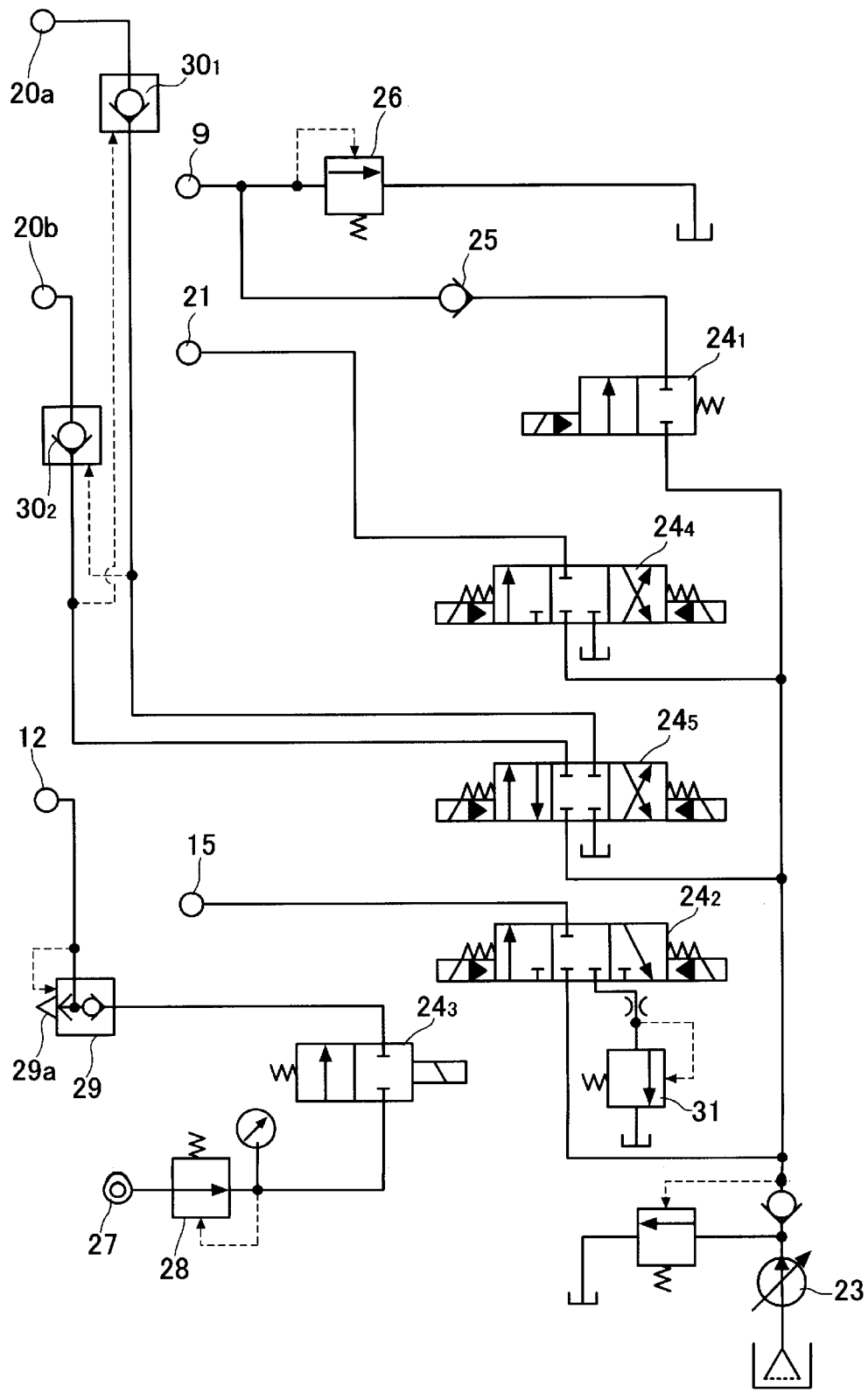
FIG. 3 is a fluid circuit diagram of the forging apparatus.

FIG. 3 shows a fluid circuit for the above-described forging apparatus. This hydraulic circuit has the following arrangement. Namely, oil from a hydraulic oil pump 23 is supplied to the first oil chamber 9 through a first solenoid valve 24$_1$ and a check valve 25. In this manner, an upper limit value of the oil pressure in the first oil chamber 9 can be set by a relief valve 26. The oil can be supplied to, and discharged from, the third oil chamber 15 through a second solenoid valve 24$_2$. Air from an air supply source 27 within a factory in which the forging apparatus is installed can be supplied to the air chamber 12 through a third solenoid valve 24$_3$ after pressure regulation by a regulator 28. A shuttle valve 29 for supplying and discharging air is interposed between the third solenoid valve 24$_3$ and the air chamber 12. When the third solenoid valve 24$_3$ is closed, the air is discharged from the air chamber 12 through a discharge port 29*a* of the shuttle valve 29. The oil is supplied to, and discharged from, the fourth oil chamber 21 through the fourth solenoid valve 24$_4$. The oil can be selectively supplied to, and discharged from, the upper chamber 20*a* and the lower chamber 20*b* of each of the cylinder sections 20 through a fifth solenoid valve 24$_5$. Further, a pilot check valve 30$_1$, 30$_2$ is interposed between each of the upper and lower chambers 20*a*, 20*b* and the fifth solenoid valve 24$_5$, respectively. At the time of supplying the oil to the upper chamber 20*a*, the pilot check valve 30$_2$ is opened to thereby discharge the oil from the lower chamber 20*b*. At the time of supplying the oil to the lower chamber 20*b*, the pilot check valve 30$_1$ is opened to thereby discharge the oil from the upper chamber 20*a*. A relief valve 31 is interposed in an oil discharge passage which is in communication with the oil discharge port of the second solenoid valve 24$_2$.

A high pressure is operated on, or applied to, the oil passage between the first oil chamber 9 and the check valve 25 as well as the relief valve 26, and also to the oil passage between the lower chamber 20*b* and the pilot check valve 30$_2$. Therefore, at least these valves are mounted on the upper die holder 5 so that no high pressure is applied to flexible hoses to be connected to the upper die holder 5.

Figure 4:
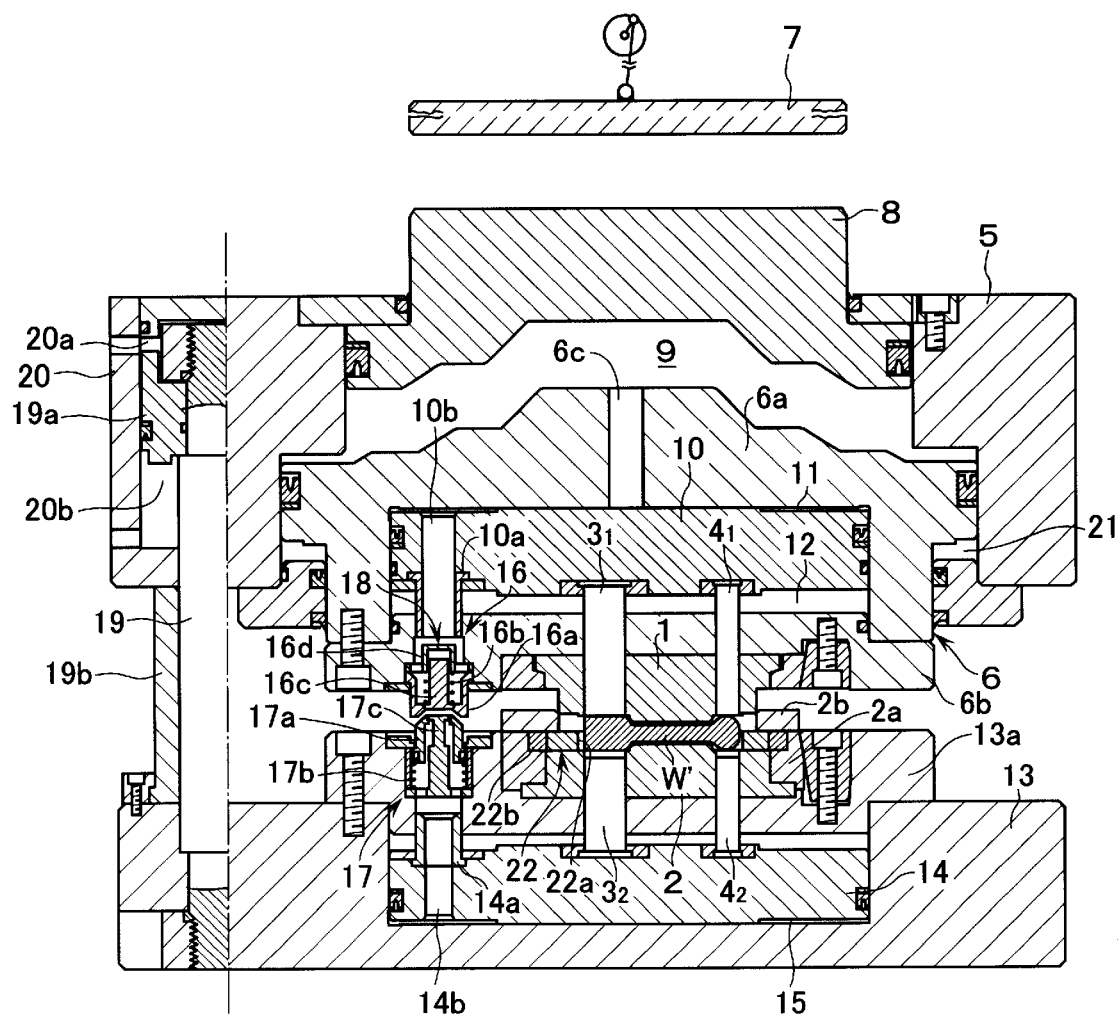
FIG. 4 is a vertical sectional view of the forging apparatus in FIG. 2 in a state at the time of starting a first forging step.

In forming the connecting rod blank W, the following steps are taken. Namely, as shown in FIG. 2, a preform W' is set on the lower die 2 in such a manner that it is contained inside the forming hole 22*a* in the intermediate die 22. The oil is supplied to the lower chamber 20*b* of each of the cylinder sections 20, whereby the upper die holder 5 is pushed down to the lower end position. When the upper die holder 5 has reached the lower end position and when this fact is detected by a sensor (not illustrated), the press ram 7 begins to lower, and the oil is discharged from the fourth oil chamber 21. The first piston 6, thus, lowers by its own weight to a position in which the upper die 1 comes into contact with the preform W', whereby a state as shown in FIG. 4 is attained.

Figure 5:
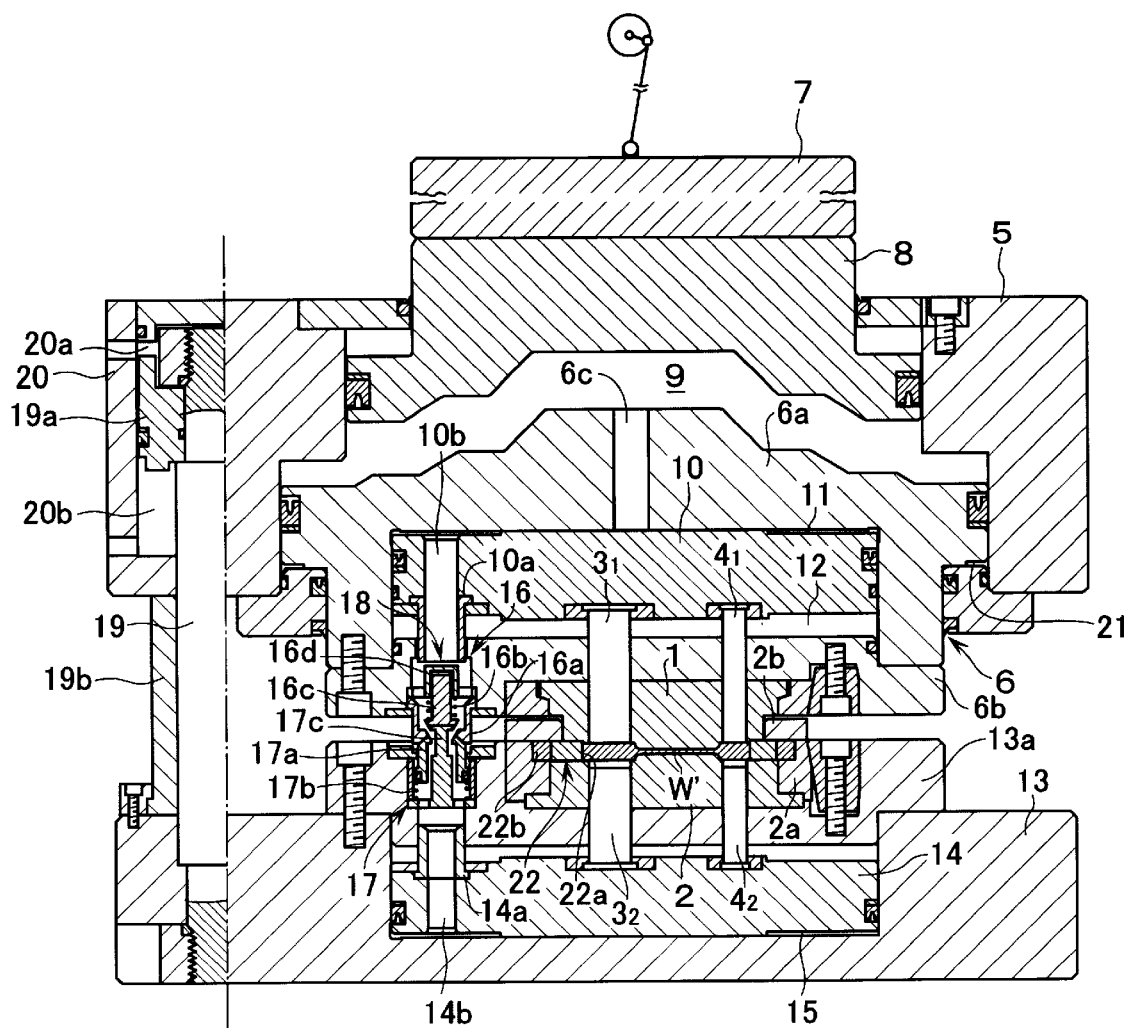
FIG. 5 is a vertical sectional view of the forging apparatus in FIG. 2 in a state at the time of completing the first forging step.

Thereafter, the press ram 7 comes into contact with the ram piston 8 to thereby push down the ram piston 8. The first piston 10 is then pushed down by the oil pressure in the first oil chamber 9 by a force which is larger than the pressing force of the press ram 7. There is thus started a first forging step in which the preform W' is roughly forged inside the forming hole 22*a* by the upper and lower dies 1, 2 into the shape of the connecting rod blank W. The first forging step is completed when, as shown in FIG. 5, the upper die 1 is closed to the lower die 2. In this state, the first and second joints 16, 17 are joined together and the second oil chamber 11 and the third oil chamber 15 are communicated with each other. However, the second piston 10 is held by the air pressure in the air chamber 12 in a retreated position in which the communicating hole 6*c* is blocked or closed. Therefore, no oil pressure is being applied to the second and third oil chambers 11, 15. Further, in a state in which the first forging step has been completed, there is constituted or provided a closed forming space by the forming hole 22*a* between the upper die 1 and the lower die 2.

Figure 6:
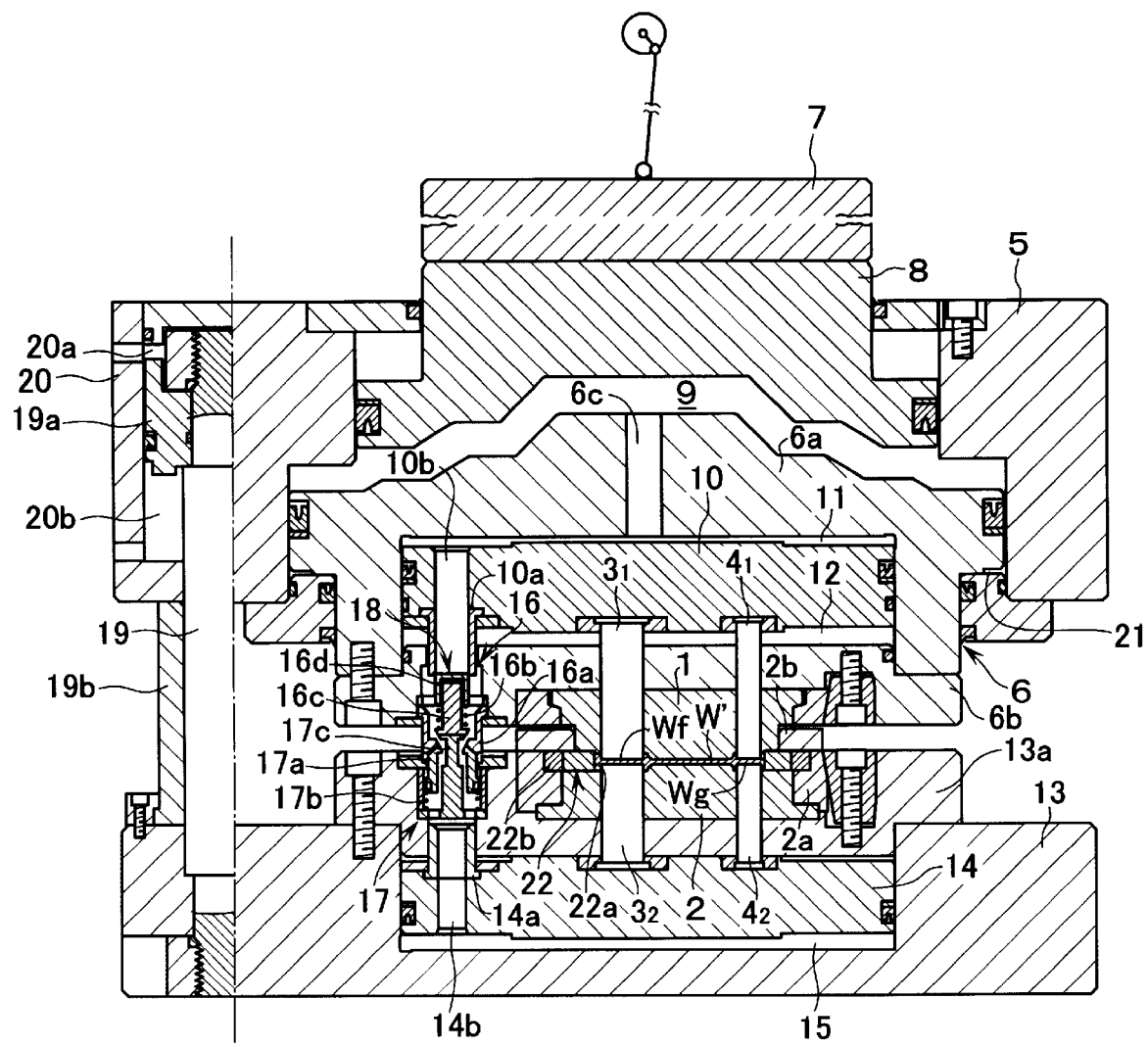
FIG. 6 is a vertical sectional view of the forging apparatus in FIG. 2 in a state at the time of completing a second forging step.

When the press ram 7 lowers to the position in which the die closing is completed and when this fact is detected by a sensor (not illustrated), the air supply to the air chamber 12 is stopped, and the air is rapidly discharged from the air chamber 12 through the shuttle valve 29. According to this arrangement, the blocking of the communicating hole 6*c* by the second piston 10 is released. As a result of subsequent lowering of the press ram 7, the oil inside the first oil chamber 9 flows into the second oil chamber 11 and the third oil chamber 15. The second piston 10 is thus pushed down by the oil pressure in the second oil chamber 11, and the third piston 14 is pushed up by the oil pressure in the third oil chamber 15. As a result, as shown in FIG. 6, the large-end punches 3$_1$, 3$_2$ and the small-end punches 4$_1$, 4$_2$ on the side of the upper die 1 and the lower die 2, respectively, are pushed from the upper side and the lower side into the forming space between the first and second dies 1, 2 to thereby perform the second forging step. In this second forging step, that part of the large-end portion Wa which is to be pierced or punched and that part of the small-end portion Wb which is to be pierced or punched are respectively forged. The material of the preform W' is caused to flow into possible underfilled portions which may be left in the portion other than those parts to be pierced in the large-end portion Wa and the small-end portion Wb, whereby the underfilled portions are filled with the material. When the first piston 6 is lowered to a position in which the second forging step is completed, the communicating pipe 10*a* reaches the valve guide 16*d*. In other words, the valve 18 is closed and the communication between the second oil chamber 11 and the third oil chamber 15 is shut off.

Figure 7:
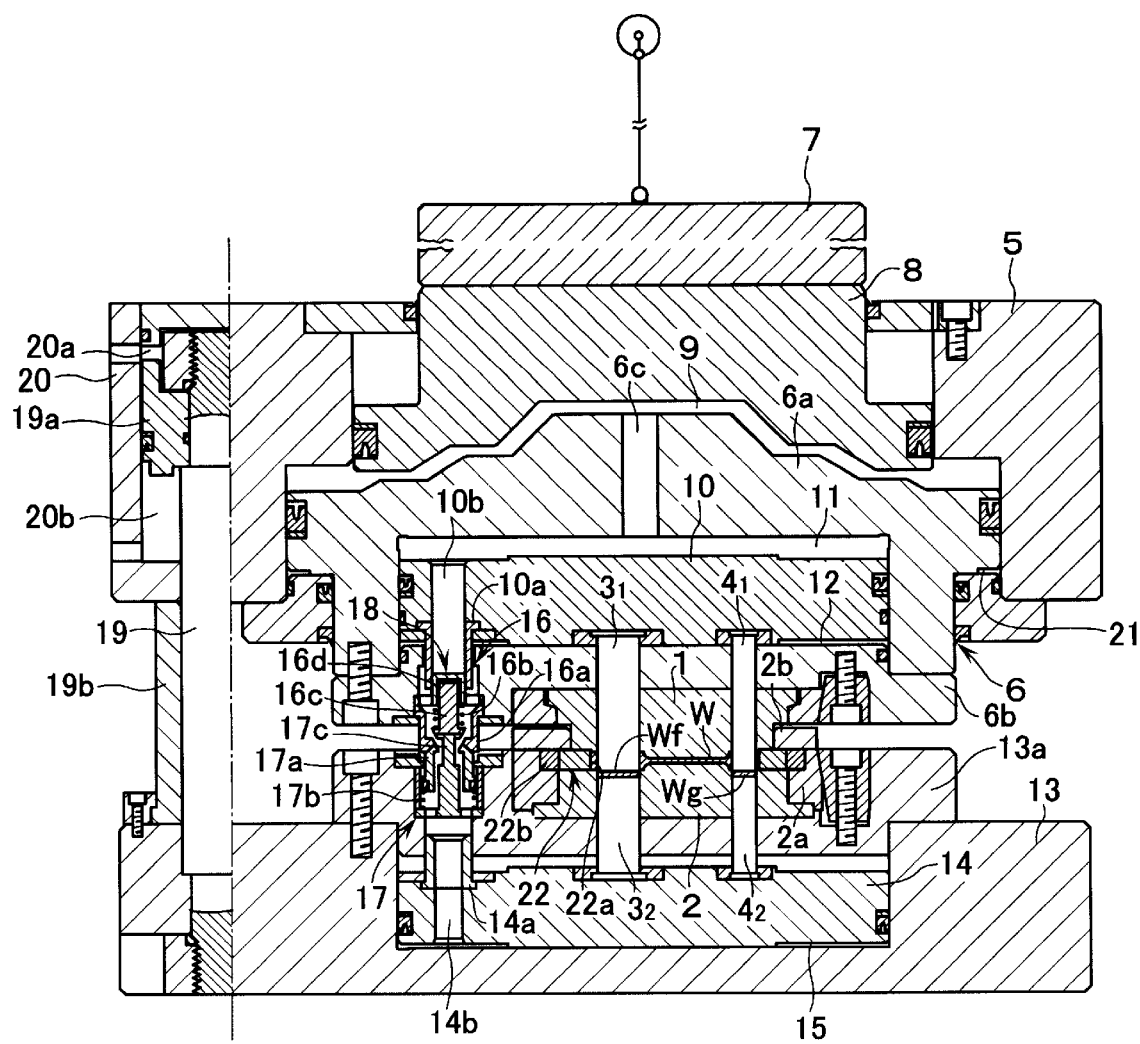
FIG. 7 is a vertical sectional view of the forging apparatus in FIG. 2 in a state at the time of completing a piercing step.

When the press ram 7 is lowered to the position in which the second forging step is completed and when this fact is detected by a sensor (not illustrated), the oil is discharged from the third oil chamber 15. The pushing up of the third piston 14 is thus released and, as a result of oil flow into the second oil chamber 11 by the subsequent lowering of the press ram 7, the second piston 10 is further pushed down. Then, as shown in FIG. 7, the large-end portion punch $3_2$ and the small-end portion punch $4_2$ both on the side of the upper die 1 are further pushed deep into the forming space until they reach the lower die 2 while pushing out of the forming space the large-end portion punch $3_2$ and the small-end portion punch $4_2$ both on the side of the lower die 2. The pads (or excess metal) Wf, Wg left between the large-end portion punches $3_1$, $3_2$ and between the small-end portion punches $4_1$, $4_2$ are punched out, whereby the holes Wd, We are formed.

Once the piercing step has been completed as explained above, the press ram 7 is lifted first. The upper die holder 5 is then lifted by supplying the oil into the upper chamber 20a of each of the cylinder sections 20. Thereafter, the second piston 10 is lifted by supplying the air into the air chamber 12. The first piston 6 is then lifted by supplying the oil into the fourth oil chamber 21, and the ram piston 8 is thereafter lifted by supplying the oil into the first oil chamber 9. The ram piston 8, the upper die holder 5, the first piston 6 and the second piston 10 are returned to their original positions. Then, the formed connecting rod blank W is taken out. Thereafter, the third piston 14 is lifted by feeding the third oil chamber 15 with the oil to thereby push the pads Wf, Wg out of the lower die 2 by means of the large-end portion punch $3_2$ and the low-end portion punch $4_2$ both on the side of the lower die 2 and blow them off with air. Finally, the oil is discharged from the third oil chamber 15 to thereby lower the third piston 14, whereby one pressing cycle is completed.

Figure 8:
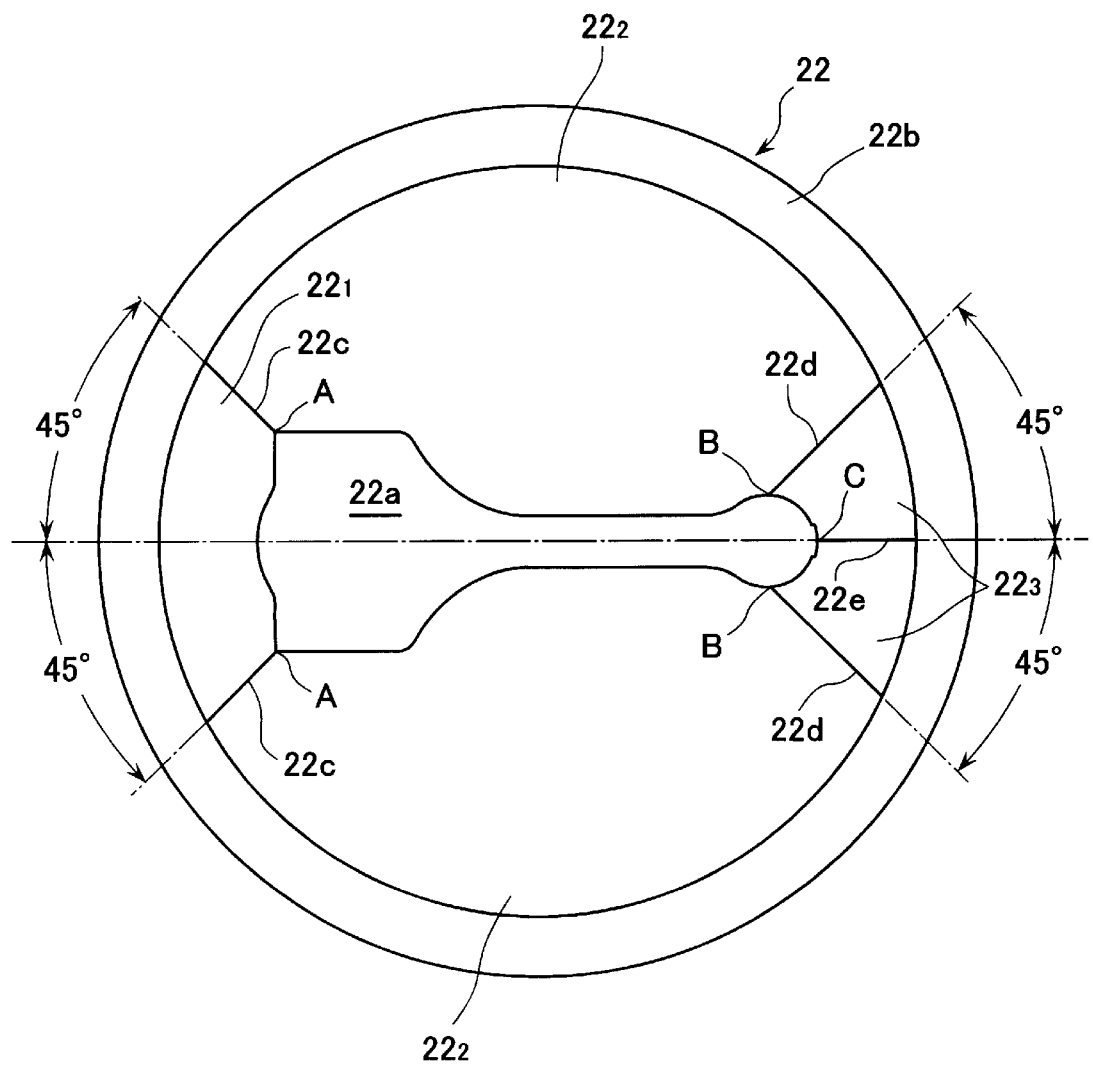
FIG. 8 is a plan view of an intermediate die provided in the forging apparatus in FIG. 2.

In forming the above-described connecting rod blank W, the intermediate die 22 is subjected to forces which function to enlarge the forming hole 22a in the longitudinal direction and in the lateral (width) direction. In case the intermediate die 22 is made of an integral part, there will occur tensile stress concentrations as explained hereinbelow. Namely, expanding force in the longitudinal direction of the forming hole 22a operates on a) that peripheral part of the forming hole 22a which coincides with such an end of the large-end portion Wa as is opposite to the rod portion Wc and expanding force in the width (lateral) direction of the forming hole 22a operates on b) that peripheral part of the forming hole 22a which coincides with each side of the large-end portion Wa. Due to these expanding forces, a tensile stress concentrates on those peripheral parts of the forming hole 22a, as shown by "A" in FIG. 8, which coincide with both side edges of the end of the large-end portion Wa. Further, a component of an expanding force which is in the longitudinally inward direction of the forming hole 22a operates on c) that peripheral part of the forming hole 22a which coincides with such a circumferential part of the small-end portion Wb as is closer to the rod portion Wc. A component of an expanding force which is in the longitudinally outward direction of the forming hole 22a also operates on d) that peripheral part of the forming hole 22a which coincides with such a peripheral part of the small-end portion Wb as is on the top end side (i.e., on the side away from the rod portion Wc). Due to these components of forces, tensile stresses concentrate on those parts of the forming hole 22a, as shown by "B" in FIG. 8, which coincide with the periphery on both sides having the largest width in the small-end portion Wb. Still furthermore, expanding forces in widthwise one direction and in the widthwise opposite direction operate on e) that peripheral part of the forming hole 22a which coincides with a half periphery on one width side of the small-end portion Wb, and on f) that peripheral part of the forming hole 22a which coincides with a half periphery on the opposite width side of the small-end portion Wb. Due to these expanding forces, tensile stresses concentrate on that peripheral part of the forming hole 22a, as shown by "C" in FIG. 8, which coincides with such an apex portion of the connecting rod of the small-end portion Wa as is opposite to the rod portion Wc.

As a solution to the above problems, the present embodiment employs the following arrangement. Namely, the intermediate die 22 is divided into a total of the following five segmented dies: i.e., a first segmented die $22_1$ which constitutes that peripheral part of the forming hole 22a which coincides with the end of the large-end portion Wa; a pair of second segmented dies $22_2$, $22_2$ which constitute the peripheral parts from the portions A to the portions B on both sides of the forming hole 22a; and a pair of third segmented dies $22_3$, $22_3$ which constitute the peripheral part from the portions B on both sides of the forming hole 22a to the portion C. According to this arrangement, concentrated stresses no longer occur in any of the portions A, B and C. Therefore, the occurrence of cracks in the intermediate die 22 due to concentrated stresses can be prevented.

In addition, the circumferential surfaces of the first through third segmented dies $22_1$, $22_2$, $22_3$ are formed into an arcuate shape of the same diameter. These segmented dies $22_1$, $22_2$, $22_3$ are forcibly fitted into a circular ring member 22b and are tightened from the outer circumference inward such that respective dividing (or segmented) surfaces 22c, 22d, 22e of the segmented dies are brought into pressurized contact with each other. The dividing surface 22c between the first segmented die $22_3$, and each of the second segmented dies $22_2$, and the dividing surface 22d of each of the second segmented dies $22_2$ and each of the third segmented dies $22_3$ are formed such that the angle formed by a central surface in the widthwise center of the forming hole 22a and each of the dividing surfaces $22_c$, 22d becomes 45°, respectively. The dividing surface 22e of the pair of the third segmented dies $22_3$, $22_3$ is formed to coincide with the above-described central surface. According to this arrangement, the first segmented die $22_1$ and the second segmented die $22_2$, and the second segmented die $22_2$ and the third segmented die $22_3$, as well as the pair of the third segmented dies $22_3$, $22_3$ are forcibly tightened to each other at each of the dividing surfaces 22c, 22d, 22e by the tightening force of the ring member 22b from the outer circumference. In this manner, the occurrence of burrs due to the inclusion (or protrusion) of the material of the connecting rod blank W into the dividing surfaces 22c, 22d, 22e can be prevented. The connecting rod blank W can thus be formed at a good accuracy.

Figure 9:
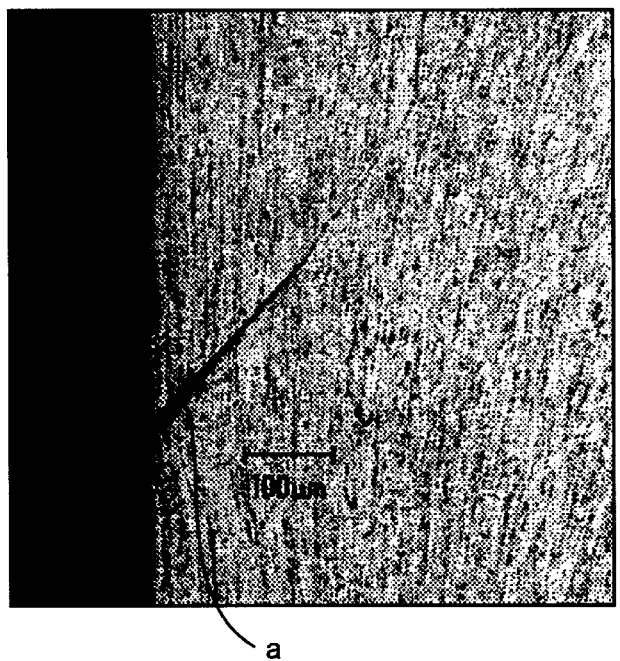
FIG. 9 shows a crack which occurred to a peripheral wall of the hole on a small-end portion.

In the piercing step, if the internal pressure in the third oil chamber 15 is suddenly decreased to the atmospheric pressure, cracks "a" are likely to occur, as shown in FIG. 9, in the inner peripheral walls of the hole Wd, We, particularly, in that portion of the inner peripheral wall of the small-end portion Wb which is closer to the lower die 2.

Figure 10A:
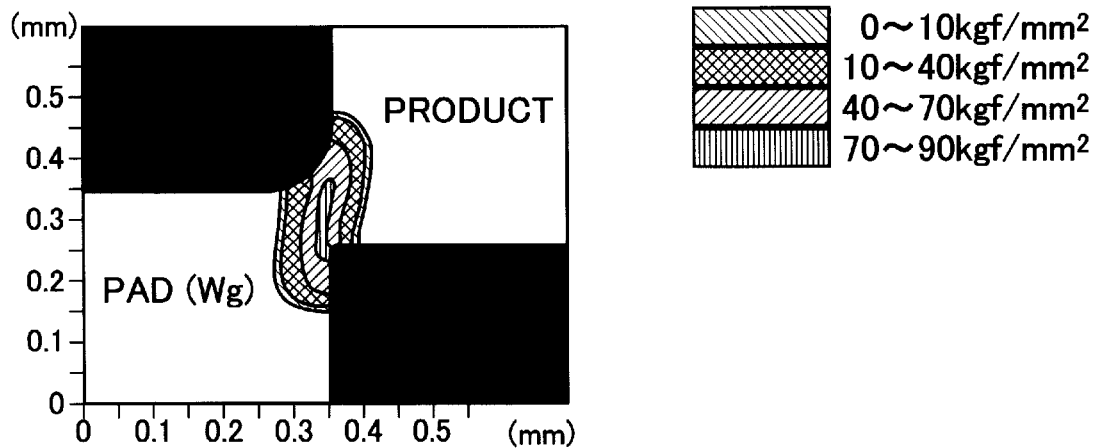
FIG. 10A is a graph showing the distribution of the tensile stresses of the small-end portion when a punch on the side of the lower die is being pushed in a load-free state from a forming space in the piercing step, and 10B is a graph showing the distribution of the tensile stresses when a load is applied to resist the pushing of the punch on the side of the lower die in the piercing step.
Figure 10B:
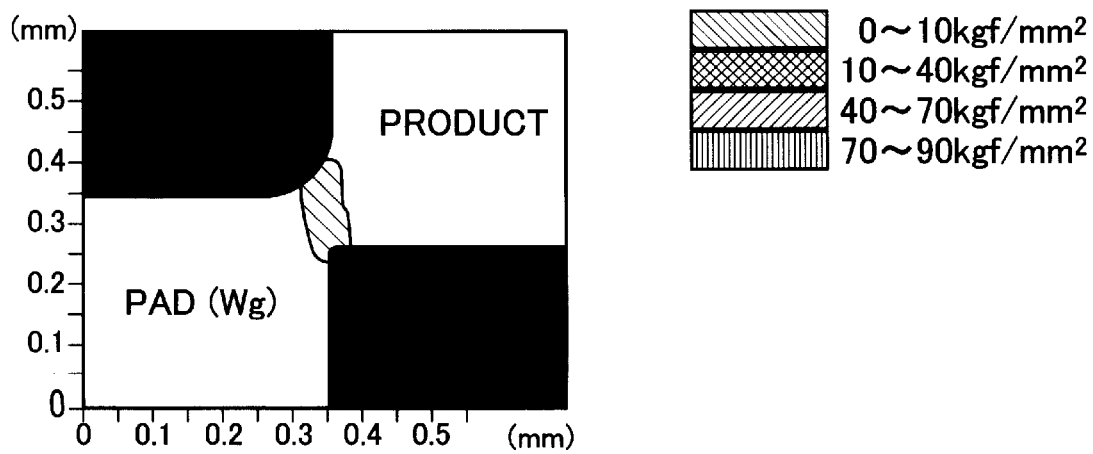
Figure 12:
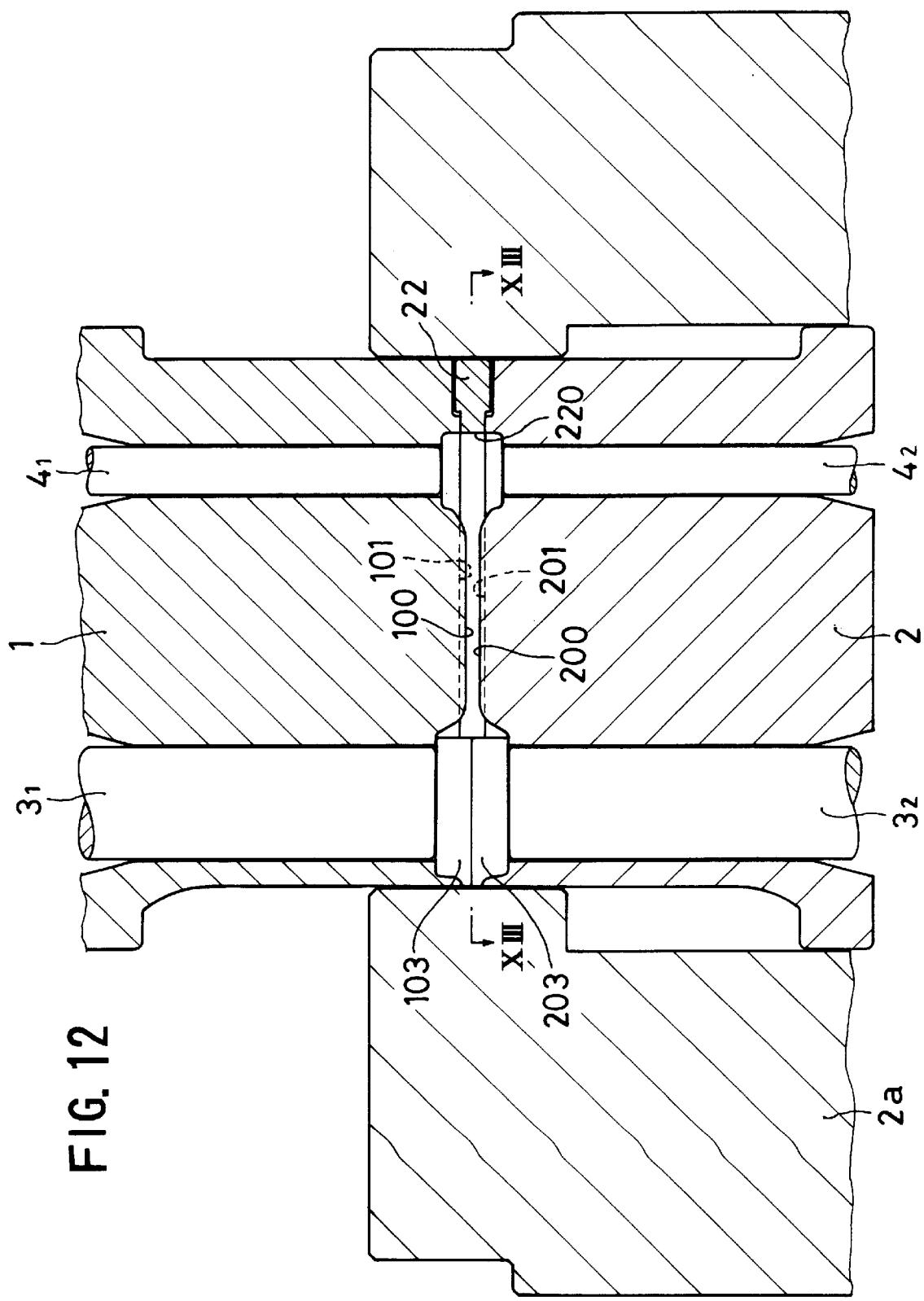
FIG. 12 is a vertical sectional view of a second embodiment of the double-action type of forging apparatus.
Figure 13:
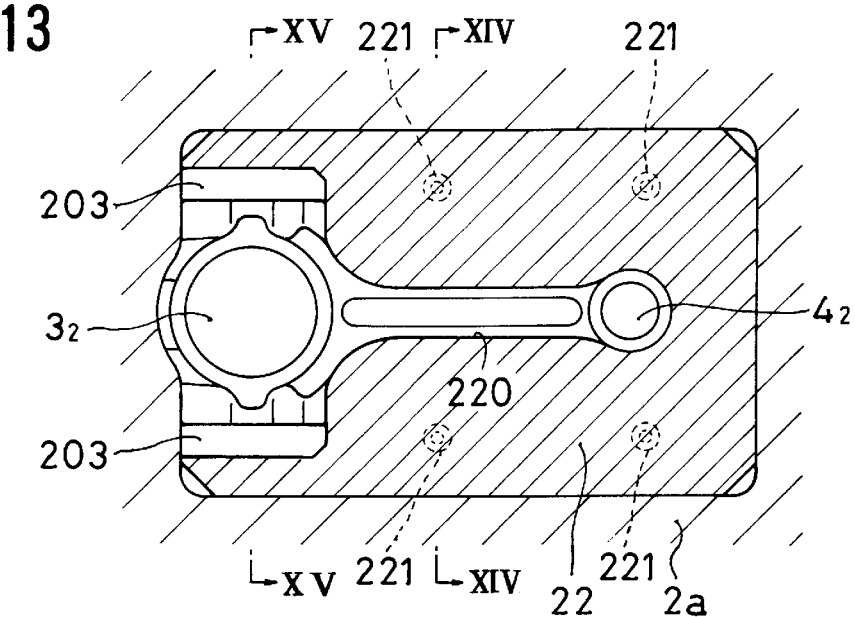
FIG. 13 is a sectional plan view taken along the line XIII—XIII in FIG. 12.
Figure 14:
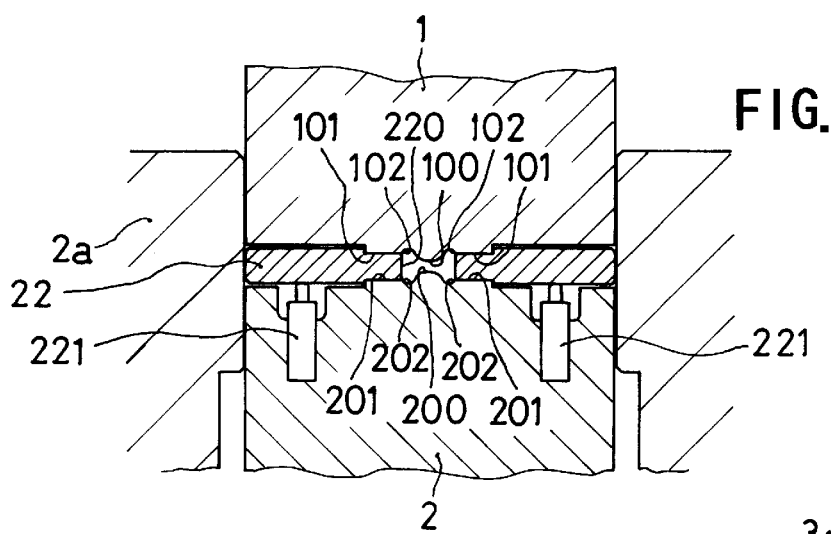
FIG. 14 is a sectional side view taken along the line XIV—XIV in FIG. 13.
Figure 15:
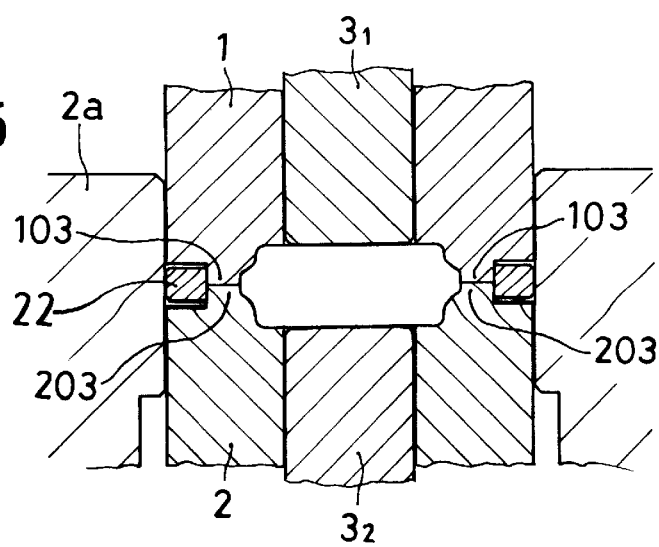
FIG. 15 is a sectional side view taken along the line XV—XV in FIG. 13.

In order to investigate the cause for the occurrence of the cracks, the following analysis was made. Namely, the distribution of the tensile stresses which occur between the pad Wg and the product portion before the pad Wg in the small-end portion Wb have been completely punched out was analyzed with a computer on a connecting rod blank W with a small-end portion having an outer diameter of 31 mm, an inner diameter of 22 mm and a thickness of 20 mm. As a result, the following has been found. Namely, when a load in a direction to resist the extrusion is not operated on the small-end portion punch $4_2$ on the side of the lower die 2 which is pushed out of the forming space in the piercing step, the distribution of the tensile stresses was found to be as shown in FIG. 10A. When a load of 90 kgf/mm$^2$ operating in a direction to resist the extrusion was applied, the distribution of the tensile stresses was found to be as shown in FIG. 10B. As can be seen from FIGS. 10A and 10B, when the small-end portion punch $4_2$ was made free of load, relatively high tensile stresses occurred to the product portion. On the other hand, when the small-end portion punch $4_2$ was subjected to a load, tensile stresses became smaller. It has also been confirmed that, as the tensile stresses become smaller, the cracks are less likely to occur. From the above, it has been found that the cracks occur under the influence of the tensile stresses which occur in the product portion at the time of punching out of the pad Wg.

Figure 11:
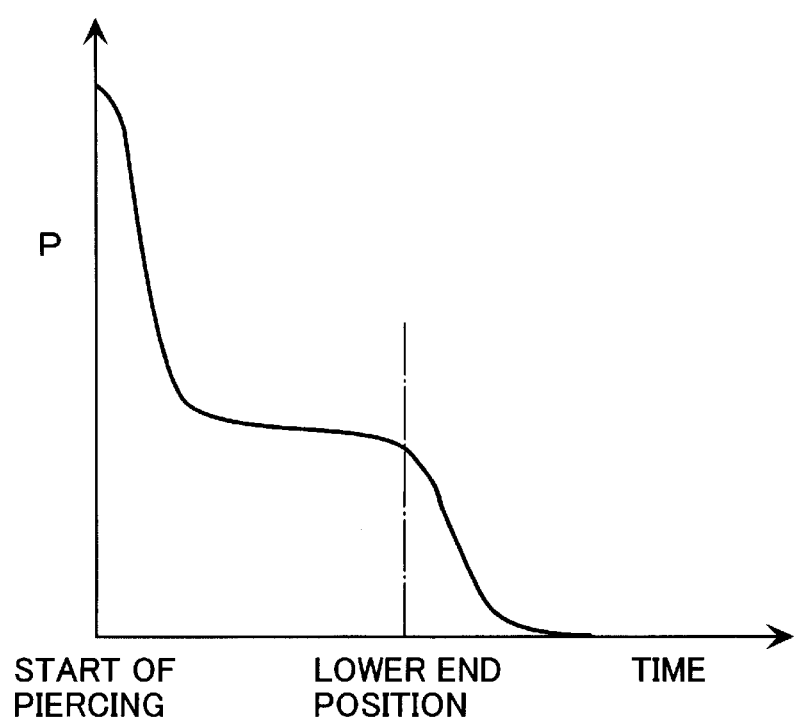
FIG. 11 is a graph showing the change in the internal pressure in a third oil chamber which pushes the punch on the side of the lower die upward in the piercing step.

In this embodiment, there is provided the relief valve 31 as explained hereinabove. According to this arrangement, as shown in FIG. 11, the internal pressure P in the third oil chamber 15 once suddenly drops by the switching of the second solenoid valve $24_2$ to the oil discharge position, i.e., by the starting of the piercing step. However, a further dropping in the internal pressure P is restrained once it has dropped down to a set relief pressure of the relief valve 31. Once the large-end portion punch $3_1$ and the small-end portion punch $4_1$ on the side of the upper die 1 have reached the lower end position and, consequently, pushing forces from the large-end portion punch 31 and the small-end portion punch $4_1$ on the side of the upper die 1 cease to act on the large-end portion punch $3_1$ and the small-end portion punch $4_1$ on the side of the lower die 2, the internal pressure P is dropped to the atmospheric pressure. In this manner, if the dropping in the internal pressure P in the third oil chamber 15 is restrained, a load is applied to the large-end portion punch $3_2$ and the small-end portion punch $4_2$ on the side of the lower die 2 in the direction to resist the pushing down of the punches $3_2$, $4_2$. As a result, the tensile stresses which occur to the product portion at the time of punching out the pads Wf, Wg are reduced. An experiment made on a connecting rod blank W having a small-end portion Wb of the same dimensions as those explained above has confirmed that cracks cease to occur if the set relief pressure of the relief valve 31 is set to a value above 31 kgf/mm$^2$.

FIGS. 12 through 15 show another embodiment of a double-action type of forging apparatus in which the shapes of the upper die 1, the lower die 2 and the intermediate die 22 are changed. In this embodiment, the intermediate die 22 has formed therein a forming hole 220 having a hole portion which forms a contour surface, among those contour surfaces of the connecting rod blank W which are parallel to the direction in which the upper and lower dies 1, 2 face or lie opposite to each other, from the small-end portion Wb toward a shoulder part of the large-end portion Wa. The upper die 1 and the lower die 2 have further formed therein forming surfaces 100, 200 which respectively form the side surfaces of the connecting rod blank W, and face surfaces 101, 201 which lie opposite to, or face, the intermediate die 22. On that outer peripheral edge section to form the rod portion (also called "rod-portion forming-section") in each of the forming surfaces 100, 200 which coincides with the rod portion Wc, there are formed slopes or inclined surfaces 102, 202 which chamfer, or remove the corner edge of, each of the corner parts Wc1 (see FIG. 17D) as seen in cross section of the rod portion Wc. The upper die 1 and the lower die 2 have still furthermore formed therein rising parts 103, 203 in those both side sections of the forming surfaces 100, 200 which coincide with the large-end portion Wa. The rising parts 203 on the side of the lower die 2 come into contact with the rising part 103 on the side of the upper die 1 so that the contour surfaces on both sides of the large-end portion Wa can be formed by the inner surfaces of these rising parts 103, 203. The contour surface of the end section of the large-end portion Wa is formed by the inner surface of a die ring 2a which encloses the lower die 2. The intermediate die 22 is supported on the lower die 2 through an urging means 221 such as plungers, each containing therein a spring, so that the intermediate die 22 can be kept floating from the face surface 201 of the lower die 2.

Figure 16A:
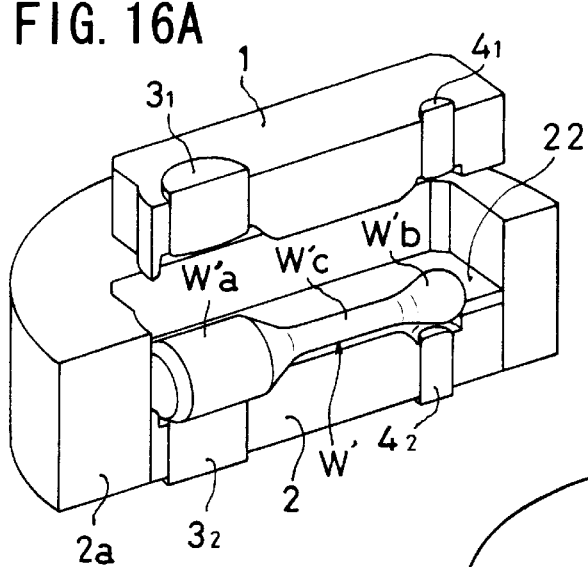
FIGS. 16A through 16D are perspective views showing the forming steps of the connecting rod blank by the forging apparatus in FIG. 12.
Figure 16B:
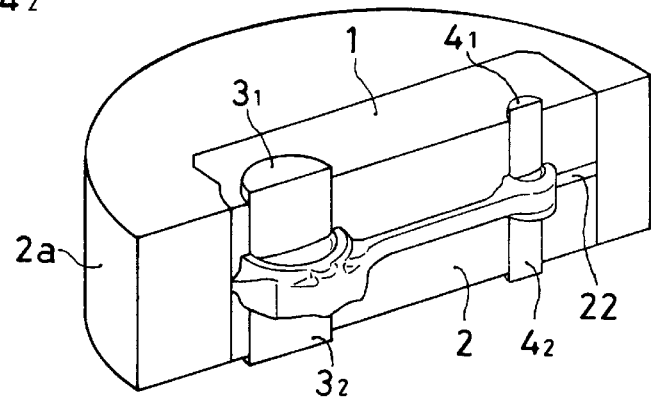
Figure 16C:
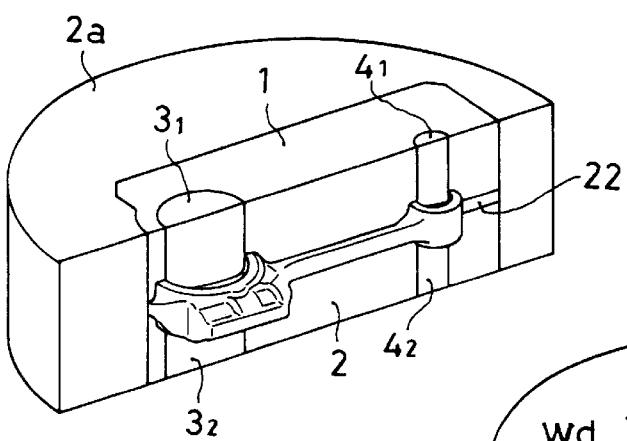
Figure 16D:
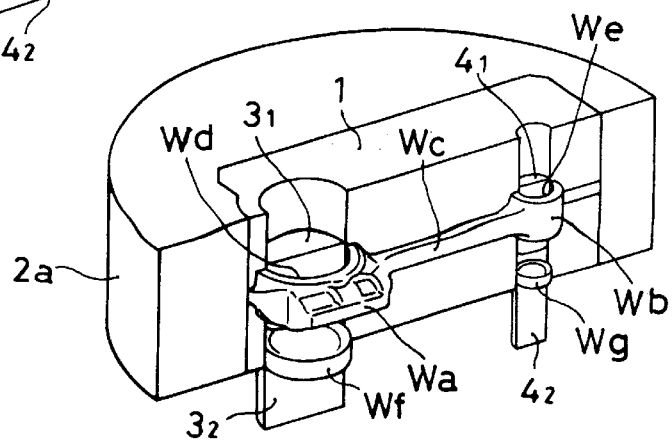

The forming of the connecting rod blank W is performed in the same manner as in the above-described embodiment. Namely, as shown in FIG. 16A, a preform W' is set in position on the lower die 2. Then, the upper die 1 is lowered to thereby perform the first forging step of closing the upper die 1 toward the lower die 2 as shown in FIG. 16B. Thereafter, as shown in FIG. 16C, there is performed a second forging step in which the large-end portion punch $3_1$ and the small-end portion punch $4_1$ on the side of the upper die 1 and the large-end portion punch $3_2$ and the small-end portion punch $4_2$ on the side of the lower die 1 are protruded or projected into the forming space between the upper and lower dies 1, 2. Then, as shown in FIG. 16D, the piercing step is performed by protruding the large-end portion punch $3_1$ and the small-end portion punch $4_1$ to reach the lower die 2 while pushing the large-end portion punch $3_2$ and the small-end portion punch $4_2$ out of the forming space.

In forming the above-described connecting rod blank W, the rod portion Wc is formed into a required shape by the closing of the upper die 1 toward the lower die 2, i.e., in the first forging step. In more detail, the upper die 1 is lowered from the state as shown in FIG. 17A. At the time when the shaft portion W'c of the preform W' is sandwiched, as shown in FIG. 17B, between the forming surfaces 100, 200 of the upper and lower dies 1, 2, the forming of the rod portion Wc starts.

When the forming has started, the preform W' sequentially deforms from the upper portion which is subjected to the forging operation by the upper die 1. Therefore, if the intermediate die 22 is fixed to the lower die 2, the material will be protruded, or finds its way, into the clearance between the face surface 101 and the intermediate die 22 before the face surface 101 of the upper die 1 gets seated onto the intermediate die 22, with the result that burrs occur. In this embodiment, however, the intermediate die 22 is supported in a manner floating on the face surface 201 of the lower die 2. Therefore, the face surface 101 of the upper die gets seated, as shown in FIG. 17C, onto the intermediate die 22 before the material is protruded into the above-described clearance. As a result, there will occur no burrs through the sidewise protrusion of the material into the clearance.

When the face surface 101 of the upper die 1 gets seated onto the intermediate die 22 and when the upper die 1 then slightly lowers, the forming of the upper part of the rod portion Wc is completed. Thereafter, the material exclusively flows downward. Then, the intermediate die 22 is caused to lower by being pulled by this flow of the material. The intermediate die 22 gets seated onto the face surface 201 before the material is protruded sidewise between the intermediate die 22 and the face surface 201 of the lower die 2. At this time, there will occur a small clearance between the face surface 101 of the upper die 1 and the intermediate die 22. However, since the upper part of the rod portion Wc will have already been work-hardened and the flow direction of the material looks downward, the material will not be protruded into this clearance. When the die closing has been completed, there is formed, as shown in FIG. 17D, a forming space enclosed in a sealed manner by the forming surfaces 100, 200 of the upper and lower dies 1, 2 and the forming hole 220 of the intermediate die 22. The rod portion Wc can thus be formed at a good accuracy without giving rise to the occurrence of burrs.

Each of the corner parts Wc1 of the rod portion Wc is formed into a chamfered shape by the inclined surfaces 102, 202 which are formed in the outer edge sections of the forming surfaces 100, 200 of each of the upper and lower dies 1, 2. Therefore, a step of chamfering the corner parts Wc1 in a subsequent step is not required any more. In addition, since the face surfaces 101, 201 are present on the outside of the inclined surfaces 102, 202, the rigidity of the inclined surfaces 102, 202 can be sufficiently secured. The durability of the dies will therefore be not shortened.

Figure 1C:
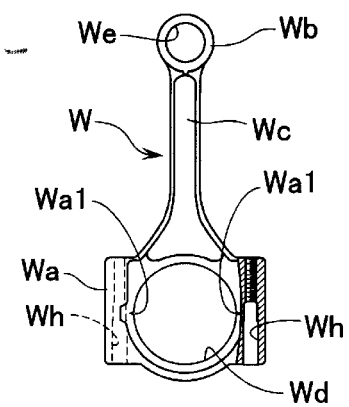
Figure 18:
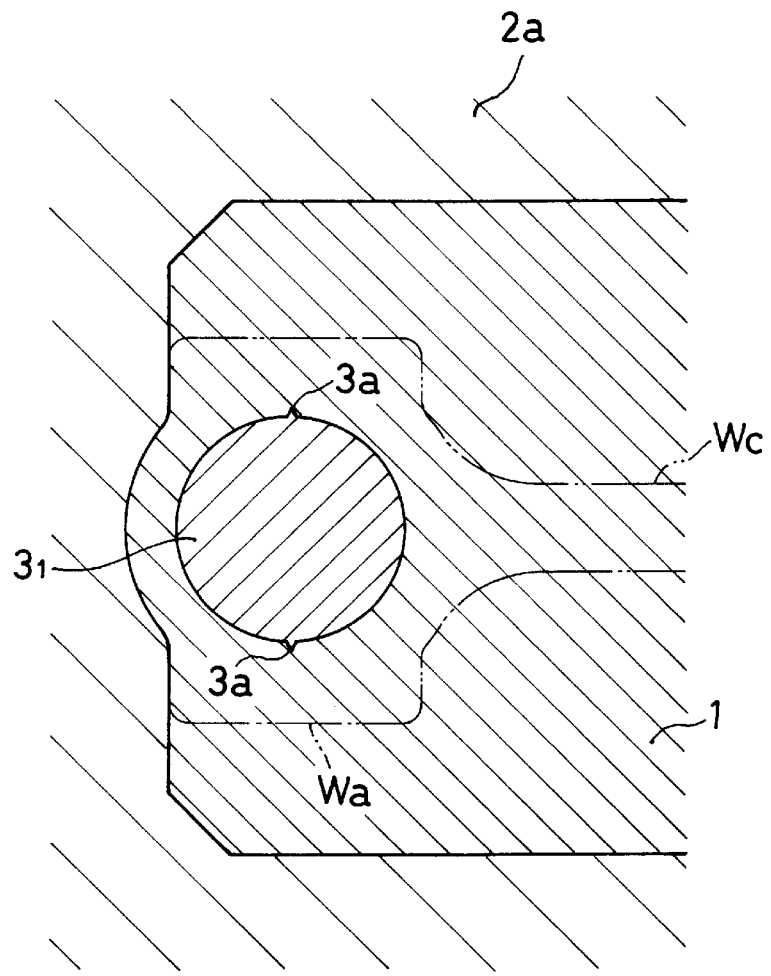
FIG. 18 is a sectional plan view of an important portion of a third embodiment of the double-action type of forging apparatus.

With reference to the rest of FIGS. 1A–1H, once the connecting rod blank W has been formed, the grinding of side surfaces of the large-end portion Wa and the small-end portion Wb, respectively, of the connecting rod blank W as well as the grinding of the inner surface of the large-end portion Wa is performed. Also, as shown in FIG. 1C, there are performed the machining of those splitting notches Wa1, Wa1 on the inner surface of the large-end portion Wa as well as the machining of connecting holes Wh, Wh for the large-end cap W2 on both sides of the large-end portion Wa. If an outer peripheral surface of the large-end portion punch 31 on the side of the upper die 1 is provided, as shown in FIG. 18, with projections 3a, 3a which coincide with the splitting surfaces of the connecting rod main body W1 and the large-end cap W2, dividing notches Wa1, Wa1 can be formed in the step of forming the connecting rod blank W by the projections 3a, 3a.

Figure 1D:
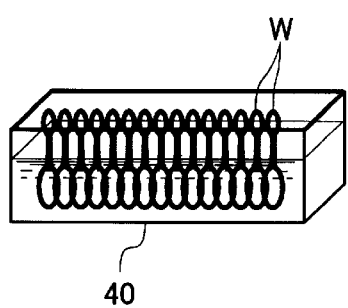
Figure 1E:
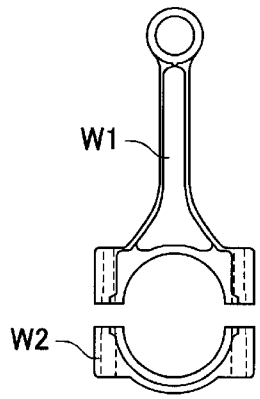
Figure 1F:
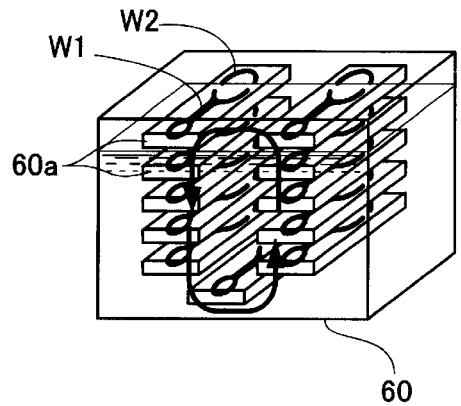

Once the above-described machining work has been completed, the large-end portions Wa are dipped, as shown in FIG. 1D, into liquefied nitrogen inside a cryostat (or a low-temperature treating bath) 40 in a state in which the connecting rod blanks W are suspended by a chain conveyor (not illustrated). In this manner, a low-temperature treatment is performed on the large-end portion Wa. Then, the large-end portion Wa is broken to thereby split, as shown in FIG. 1E, each connecting rod blank W into the rod main body W1 and the large-end cap W2. In the low-temperature treatment, the large-end portions Wa are cooled such that the temperature of the large-end portions Wa at the time of splitting is kept below −130° C. which is the brittleness transition temperature.

Figure 19:
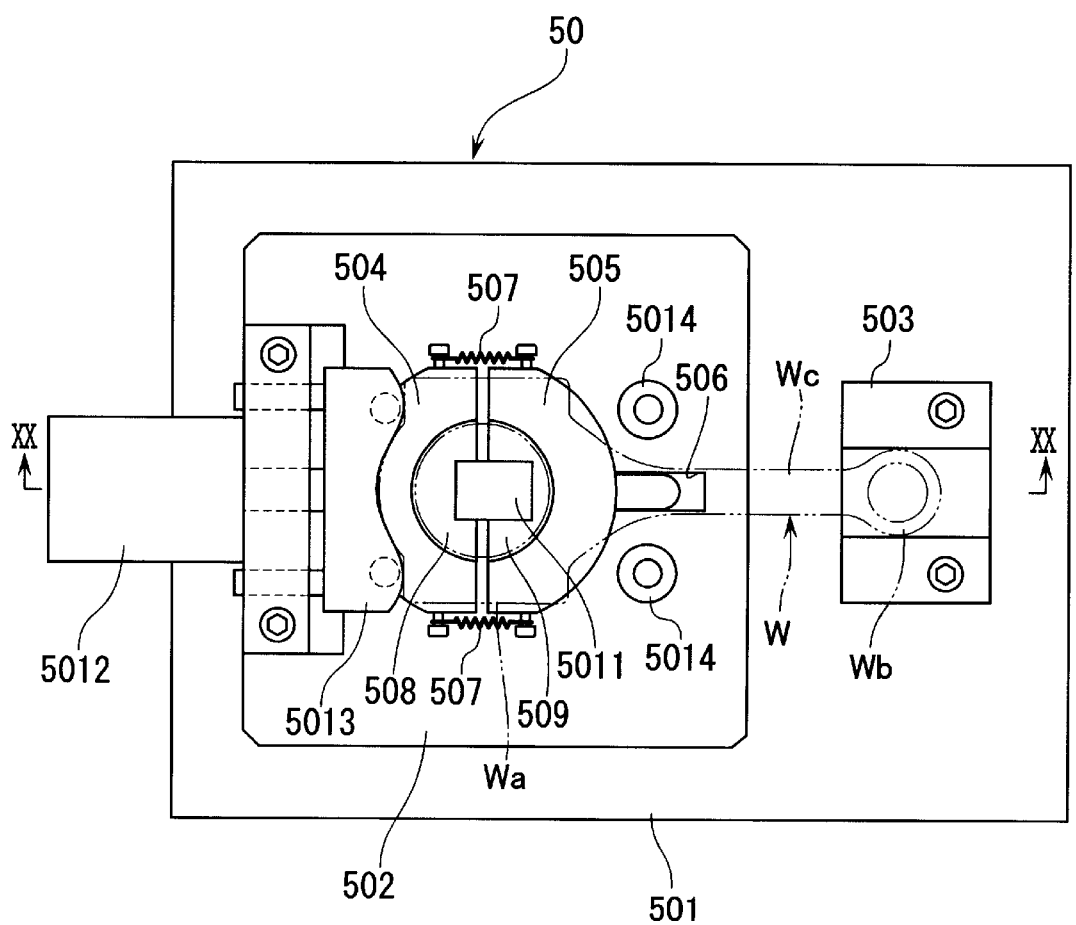
FIG. 19 is a plan view of a splitting apparatus for the connecting rod.
Figure 20:
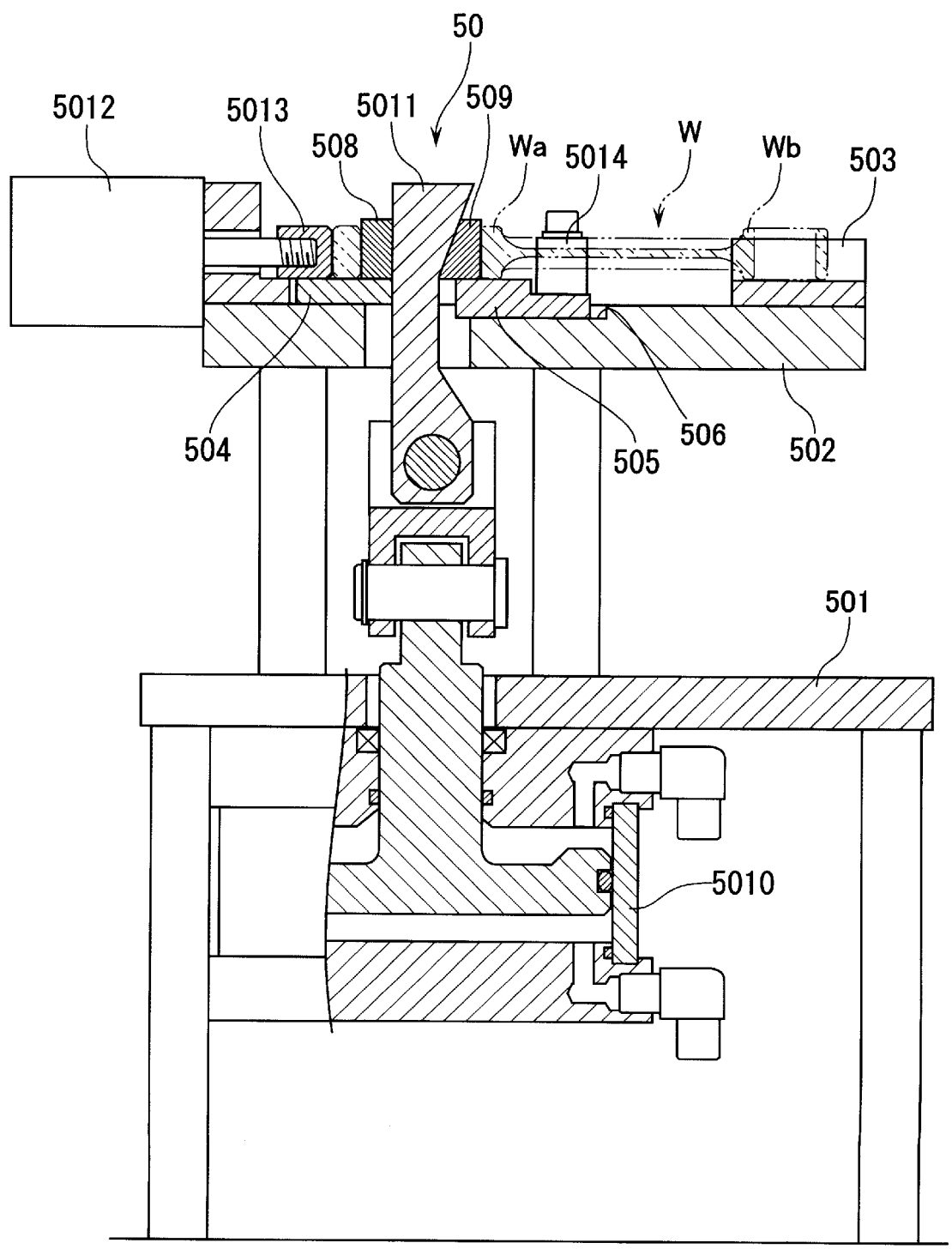
FIG. 20 is a sectional side views taken along the line XX—XX in FIG. 19.

The splitting of the connecting rod blank W is performed by using a splitting apparatus 50 as shown in FIGS. 19 and 20. This splitting apparatus 50 comprises a base 501, and a jig base 502 which is provided on the base 501. On the jig base 502 there are provided: a groove-shaped supporting member 503 which supports the small-end portion Wb so as to be slidable in the longitudinal direction of the connecting rod W, and so as not to give rise to deviations in a direction perpendicular to the longitudinal direction; a supporting plate 504 which supports the half part on the side of the large-end cap of the large-end portion Wa; and a supporting plate 505 which supports the half part on the side of the rod main body of the large-end portion Wa. The supporting plate 504 is fixed to the jig base 502. The supporting plate 505, on the other hand, is slidable in the longitudinal direction of the connecting rod blank W by being guided by a guide groove 506 which is formed in the jig base 502. The supporting plate 505 is urged toward the supporting plate 504 by means of springs 507, 507 which are provided to extend on both sides between the supporting plates 504 and 505. Between these supporting plates 504, 505 there are vertically disposed semicircular blocks 508, 509 which are inserted into the inner circumference of the large-end portion Wa. Between both the blocks 508, 509 there is disposed a wedge member 5011 which is movable up and down by a hydraulic cylinder 5010 which is mounted on the base 501. That surface of the wedge member 5011 which is on the side of the block 509 is formed into an overhung inclined surface. When the wedge member 5011 is moved down, the block 509 is pushed against the urging force of the spring 507 in the direction away from the block 508. The jig base 502 is further provided with: a clamp member 5013 which clamps the half part on the side of the large-end cap of the large-end portion Wa against the block 508 and which is operated to be opened and closed by a cylinder 5012; and a pair of stoppers 5014, 5014 which prevent the divided rod main body W1 from moving out of position.

In splitting the connecting rod blank W, the connecting rod blank W which has been subjected to a low-temperature treatment is set on the jig base 502 by an automated device (not illustrated) such as a robot or the like such that the small-end portion Wb is engaged with the supporting member 503 and that the blocks 508, 509 are inserted into the inner circumference of the large-end portion Wa. Then, the clamp member 5013 is closed and the wedge member 5011 is moved down. According to this operation, that half part of the large-end portion Wa which is on the side of the rod main body is forced toward the small-end portion Wb through the block 509. The large-end portion Wa is then fractured or broken through brittleness with the notches Wa1, Wa1 serving as origins. The connecting rod blank W is thus split into the rod main body W1 and the large-end cap W2.

Figure 1G:
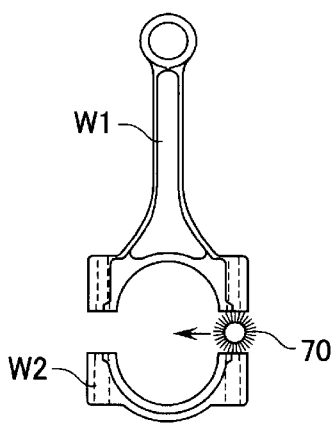

Once the splitting has been completed, the rod main body W1 and the large-end cap W2 are placed by an automated machine (not illustrated) onto a pallet 60a which is circulated inside a heating bath 60 which is filled with hot water. The heating or temperature rising processing to return the rod main body W1 and the large-end cap W2 to the ambient temperature is thus performed. Then, the split surfaces of the rod main body W1 and the large-end cap W2 are brushed, as shown in FIG. 1G, with a nylon brush 70 containing therein grinding grains.

Figure 21:
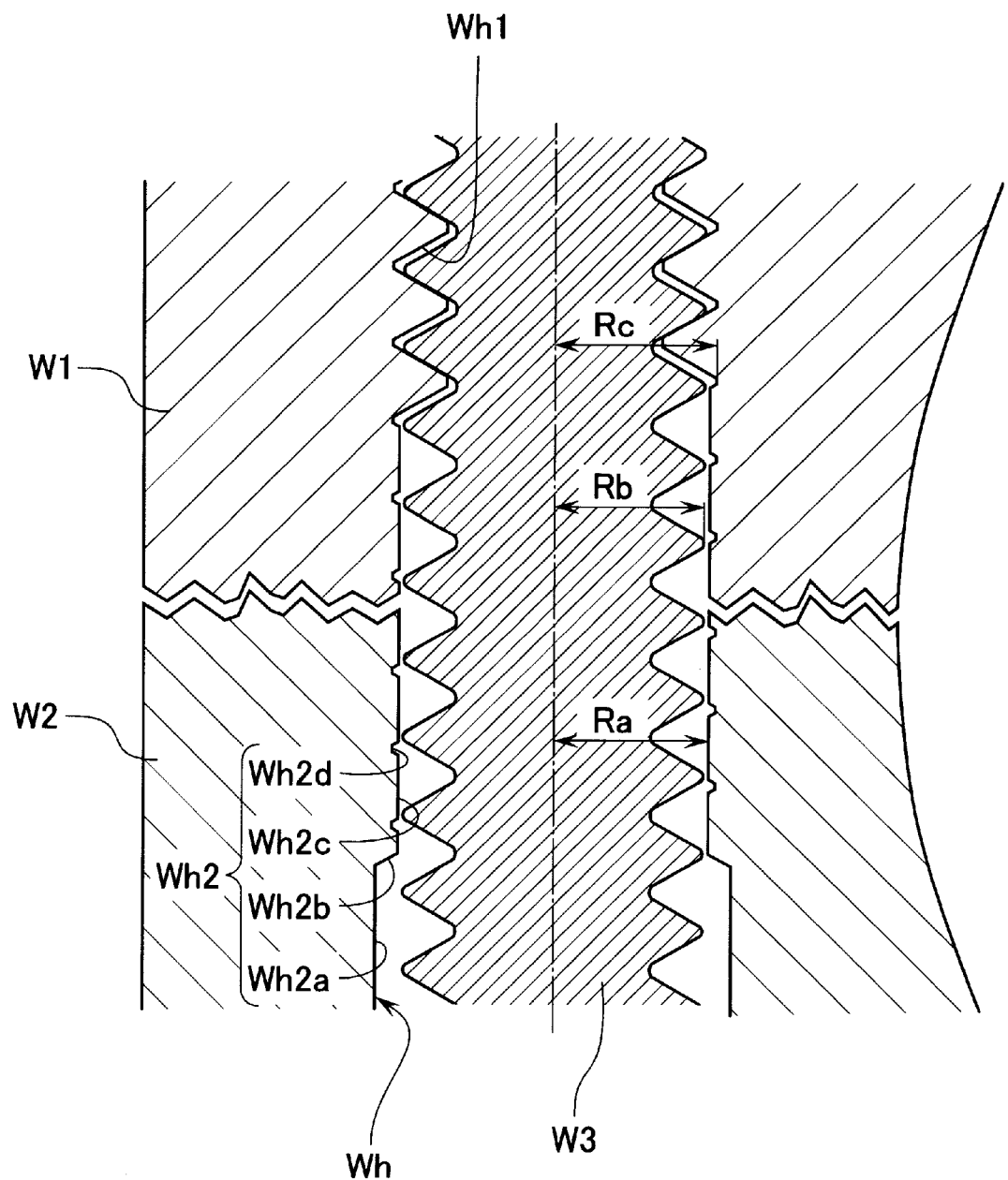
FIG. 21 is an enlarged sectional view of a connecting portion between the rod main body and the large-end cap.
Figure 22A:
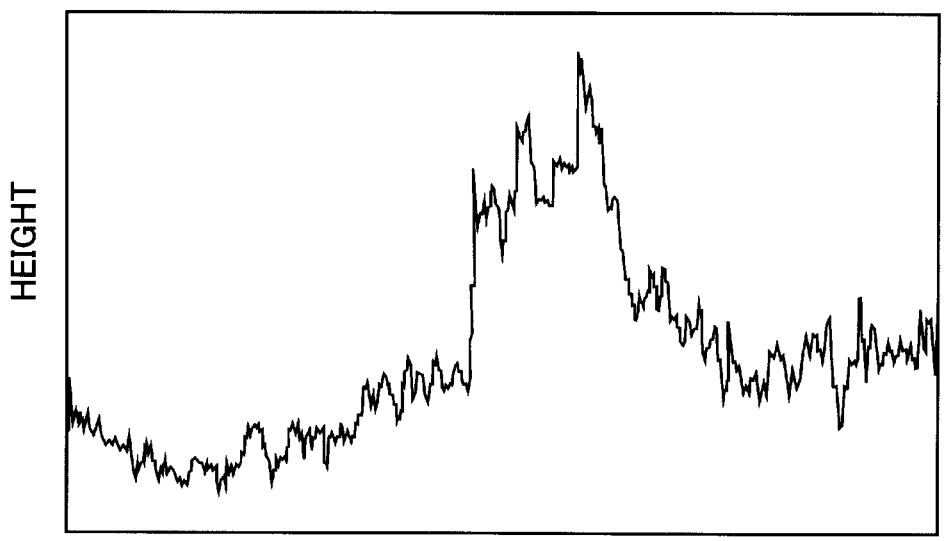
FIG. 22A is a graph showing the measurement result of the projections and recessions of the a part of the split surfaces of a rod main body and a large-end cap before brushing.
Figure 22B:
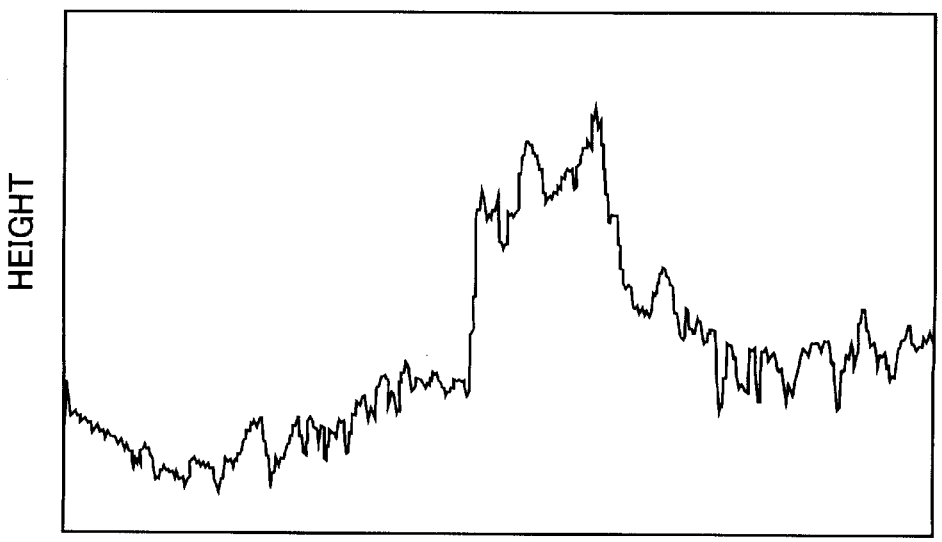
FIG. 22B is a graph showing the measurement result of the projections and recessions of the above-described portions after brushing.

The split surfaces of the rod main body W1 and the large-end cap W2 are rough brittleness-fractured surfaces with projections and recessions as shown in FIG. 21. The fractured surfaces have sometimes formed thereon minute projections which are superimposed on the projections and recessions as shown in FIG. 22A. If the surfaces are left as they are, when the large-end cap W2 is connected to the rod main body W1, the minute projections are broken and get bitten (or get caught) into the split surfaces between the rod main body W1 and the large-end cap W2. As a result, the accuracy of assembling the rod main body W1 and the large-end cap W2 becomes poor. On the other hand, if the above-described brushing is performed, the minute projections that are easily broken are removed as shown in FIG. 22B and, thus, the above-described disadvantage can be prevented.

Figure 1H:
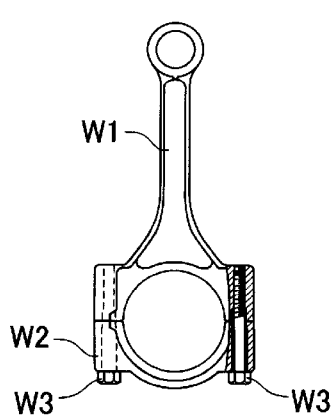

After the brushing, the split surfaces are subjected to washing and air blowing. Then, as shown in FIG. 1H, the large-end cap W2 is fastened or connected to the rod main body W1 at the connecting holes Wh by means of connecting bolts W3. Thereafter, a bush (not illustrated) is forcibly fitted into the small-end portion Wb and the finish-machining of the inner surfaces of the bush and the large-end portion Wa is performed.

The connecting hole Wh is constituted, as shown in FIG. 21, by a threaded hole Wh1 on the side of the rod main body W1 and a bolt inserting hole Wh2 which extends from the threaded hole Wh1 toward the large-end cap W2. The bolt inserting hole Wh2 is formed into a stepped hole having a large-diameter part Wh2a on a side closer to the outer end of the large-end cap W2, and a small-diameter part Wh2c which extends from the large-diameter part Wh2a through a stepped part Wh2b to the side of the threaded hole Wh1. The diameter Ra of the small-diameter part Wh2c is set to a value which is larger than the outer diameter Rb of the bolt W3 but which is smaller than the root diameter Rc of the threaded hole Wh1. The difference between the root diameter Rc of the threaded hole Wh1 and the outer diameter Rb of the bolt W3 is about 0.1 mm.

In machining the connecting hole Wh, the small-diameter part Wh2 is machined together with a prepared hole of the threaded hole Wh1. In this manner, the prepared hole of the threaded hole Wh1 and the small-diameter part Wh2c are secured to be coaxial with each other. Thereafter, the threaded hole Wh1 is subjected to tapping. Since the small-diameter part Wh2c is smaller in diameter than the root diameter Rc of the threaded hole Wh1, i.e., than the outer diameter of a tap to be used for tapping, a shallow spiral groove Wh2d will be formed on the inner surface of the small-diameter part Wh2c.

When the large-end cap W2 is connected to the rod main body W1, the bolt W3 is inserted, in a threaded manner, from the side of the large-end cap W2 into the bolt inserting hole Wh2. At this time, the play of the bolt inserting hole Wh2 relative to the bolt W3, i.e., the deviation of the large-end cap W2 relative to the rod main body W1, is restricted to 0.1 mm or less by the small-diameter portion Wh2c. Here, an average pitch of the primary projections and recessions exclusive of the minute projections and recessions on the split surface is about 0.15 mm. Therefore, the projections and recessions on the split surface of the large-end cap W2 will not deviate to the position facing the projections and recessions which are different from the corresponding projections and recessions on the split surface of the rod main body W1. In this manner, the large-end cap W2 can be connected to the rod main body W1 in a state in which the projections and recessions on the split surface of the large-end cap W2 are engaged with the corresponding projections and recessions on the split surface of the rod main body W1.

It is readily apparent that the above-described method of manufacturing a connecting rod meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing a connecting rod for an engine, said connecting rod comprising a rod main body and a large-end cap, said method comprising the steps of:
    forming, by cold forging, a connecting rod blank which is shaped into an integral combination of a rod main body and a large-end cap and which has a large-end portion, a small-end portion, and a rod portion therebetween;
    splitting the connecting rod blank into the rod main body and the large-end cap;
    said step of forming the connecting rod blank being performed by a double-action type of forging apparatus comprising:
        an upper die which is movable up and down;
        a lower die;
        a large-end portion punch which is respectively provided in each of the dies so as to be movable therethrough and to lie opposite to each other at a portion to pierce the large-end portion of the connecting rod blank; and
        a small-end portion punch which is respectively provided in each of the dies so as to be movable therethrough and to lie opposite to each other at a portion to pierce the small-end portion of the connecting rod blank;
    said step of forming the connecting rod blank comprising:
        a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the perform into a shape of the connecting rod blank;
        a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and
        a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced, said first and second forging steps as well as said piercing step being carried out in a single pressing cycle;
            wherein said piercing step is performed in a state of applying a load to the large-end portion punch and the small-end portion punch provided on the other of the dies in a direction to resist the pushing of the punches out of the forming space.

2. A method of manufacturing a connecting rod for an engine, said connecting rod comprising a rod main body and a large-end cap, said method comprising the steps of:
    forming, by cold forging, a connecting rod blank which is shaped into an integral combination of a rod main body and a large-end cap and which has a large-end portion, a small-end portion, and a rod portion therebetween;
    splitting the connecting rod blank into the rod main body and the large-end cap;
    said step of forming the connecting rod blank being performed by a double-action type of forging apparatus comprising:
        an upper die which is movable up and down;
        a lower die;
        a large-end portion punch which is respectively provided in each of the dies so as to be movable therethrough and to lie opposite to each other at a portion to pierce the large-end portion of the connecting rod blank; and
        a small-end portion punch which is respectively provided in each of the dies so as to be movable therethrough and to lie opposite to each other at a portion to pierce the small-end portion of the connecting rod blank;

said step of forming the connecting rod blank comprising:
  a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the perform into a shape of the connecting rod blank;
  a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and
  a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced, said first and second forging steps as well as said piercing step being carried out in a single pressing cycle, further comprising the steps of:
    splitting the connecting rod blank into the rod main body and the large-end cap in a state in which the connecting rod blank is subjected to a low-temperature treatment;
    thereafter, returning the rod main body and the large-end cap to an ambient temperature; and
    then, brushing split surfaces of the rod main body and the large-end cap.

3. A method of manufacturing a connecting rod for an engine, said connecting rod comprising a rod main body and a large-end cap, said method comprising the steps of:

forming, by cold forging, a connecting rod blank which is shaped into an integral combination of a rod main body and a large-end cap and which has a large-end portion, a small-end portion, and a rod portion therebetween;

splitting the connecting rod blank into the rod main body and the large-end cap;

said step of forming the connecting rod blank being performed by a double-action type of forging apparatus comprising:
  an upper die which is movable up and down;
  a lower die;
  a large-end portion punch which is respectively provided in each of the dies so as to be movable therethrough and to lie opposite to each other at a portion to pierce the large-end portion of the connecting rod blank; and
  a small-end portion punch which is respectively provided in each of the dies so as to be movable therethrough and to lie opposite to each other at a portion to pierce the small-end portion of the connecting rod blank;

said step of forming the connecting rod blank comprising:
  a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the perform into a shape of the connecting rod blank;
  a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and
  a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced, said first and second forging steps as well as said piercing step being carried out in a single pressing cycle, wherein the double-action type of forging apparatus comprises:
    an upper die holder for the upper die;
    a lower die holder for the lower die;
    a hollow first piston which is inserted into the upper die holder and to which is connected the upper die;
    a second piston which is inserted into the first piston and to which are connected those large-end portion punch and the small-end portion punch which are provided so as to be movable through the upper die;
    a third piston which is inserted into the lower die and to which are connected those large-end portion punch and the small-end portion punch which are provided so as to be movable through the lower die;
    a first oil chamber inside the upper die holder which receives through the first piston a reaction force of closing the upper die toward the lower die;
    a second oil chamber inside the first piston which is defined between the second piston and a pressure receiving wall on an upper end of the first piston facing the first oil chamber;
    an air chamber inside the first piston which lies opposite to the second oil chamber with the second piston therebetween;
    a communicating hole which is formed in the pressure receiving wall and which communicates the first oil chamber and the second oil chamber;
    a third oil chamber inside the lower die holder which forces the third piston upward;
    a first joint which is provided in the first piston and which communicates with the second oil chamber;
    a second joint which is provided in the lower die and which communicates with the third oil chamber and which, at a time of completion of the first forging step, couples with the first joint to bring the second oil chamber and the third oil chamber into communication with each other; and a valve which shuts off the communication between the second oil chamber and the first joint when the downward stroke of the second piston relative to the first piston has exceeded a predetermined value at which the second forging step is completed;

wherein the communicating hole is blocked by forcing the second piston against the pressure receiving wall by an air pressure of the air chamber until the first forging step is completed and, after completion of the first forging step, the air chamber is discharged to thereby release the blocking of the communicating hole by the second piston and, after completion of the second forging step, oil is discharged from the third oil chamber.

4. A method of manufacturing a connecting rod according to claim 3, wherein a ram piston which moves in interlocking relationship with a press ram is inserted into an inside of the upper die holder to thereby define the first oil chamber between the ram piston and the first piston.

5. A method of manufacturing a connecting rod for an engine, said connecting rod comprising a rod main body and a large-end cap, said method comprising the steps of:

forming, by cold forging, a connecting rod blank which is shaped into an integral combination of a rod main body and a large-end cap and which has a large-end portion, a small-end portion, and a rod portion therebetween;

splitting the connecting rod blank into the rod main body and the large-end cap;

said step of forming the connecting rod blank being performed by a double-action type of forging apparatus comprising:

an upper die which is movable up and down;

a lower die;

a large-end portion punch which is respectively provided in each of the dies so as to be movable therethrough and to lie opposite to each other at a portion to pierce the large-end portion of the connecting rod blank; and a small-end portion punch which is respectively provided in each of the dies so as to be movable therethrough and to lie opposite to each other at a portion to pierce the small-end portion of the connecting rod blank;

said step of forming the connecting rod blank comprising:

a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the perform into a shape of the connecting rod blank;

a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced, said first and second forging steps as well as said piercing step being carried out in a single pressing cycle, wherein the double-action type of forging apparatus comprises an intermediate die which is provided on the lower die and which has a forming hole of a shape coinciding with a contour of the connecting rod blank such that a closed forming space between the upper die and the lower die is formed by the forming hole upon completion of the first forging step, said intermediate die comprising:

a first segmented die constituting that peripheral part of the forming hole which coincides with such an end in the large-end portion of the connecting rod blank as is opposite to the rod portion of the connecting rod blank;

a pair of second segmented dies each constituting that peripheral part of the forming hole which coincides with a section starting from an edge part on each side of the end to a peripheral part on each side of largest width in the small-end portion of the connecting rod blank;

a pair of third segmented dies constituting that peripheral part of the forming hole which coincides with a section from the peripheral part on each side of the largest width to that apex part of the small-end portion of the connecting rod blank which is opposite to the rod portion, wherein the above segmented dies are tightened together by a ring member so that the segmented dies are brought into forcible contact with each other at respective segmented surfaces of the dies.

6. A method of manufacturing a connecting rod according to claim 5, wherein the segmented surfaces of the first segmented die and each of the second segmented dies as well as the segmented surfaces of the second segmented dies and the third segmented dies are formed such that an angle between a central surface in the widthwise center of the forming hole and each of the segmented surfaces is 45°.

7. A method of manufacturing a connecting rod for an engine, said connecting rod comprising a rod main body and a large-end cap, said method comprising the steps of:

forming, by cold forging, a connecting rod blank which is shaped into an integral combination of a rod main body and a large-end cap and which has a large-end portion, a small-end portion, and a rod portion therebetween;

splitting the connecting rod blank into the rod main body and the large-end cap;

said step of forming the connecting rod blank being performed by a double-action type of forging apparatus comprising:

an upper die which is movable up and down;

a lower die;

a large-end portion punch which is respectively provided in each of the dies so as to be movable therethrough and to lie opposite to each other at a portion to pierce the large-end portion of the connecting rod blank; and a small-end portion punch which is respectively provided in each of the dies so as to be movable therethrough and to lie opposite to each other at a portion to pierce the small-end portion of the connecting rod blank;

said step of forming the connecting rod blank comprising:
a first forging step of closing the upper die toward the lower die while forging a preform having a shaft portion which corresponds to the rod portion of the connecting rod blank, that large-end mass portion on one end of the shaft portion which corresponds to the large-end portion of the connecting rod blank, and that small-end mass portion of the connecting rod blank which corresponds to the small-end portion of the connecting rod blank, to thereby roughly form the perform into a shape of the connecting rod blank;
a second forging step of protruding each of the large-end portion punches and each of the small-end portion punches, respectively, into a forming space between both the dies while forging those parts of the large-end portion and the small-end portion which are to be pierced, to thereby fill underfills inside the forming space; and
a piercing step of protruding the large-end portion punch and the small-end portion punch which are provided in one of the upper and lower dies until they reach the other of the dies while pushing out, from the forming space, the large-end portion punch and the small-end portion punch which are provided in the other of the upper and lower dies, to thereby punch out pads remaining in those parts of the large-end portion and the small-end portion which are to be pierced, said first and second forging steps as well as said piercing step being carried out in a single pressing cycle, wherein the double-action type of forging apparatus comprises:

an intermediate die which has a forming hole constituting a forming space enclosed by the upper die and the lower die upon completion of the first forging step, the forming hole having a hole portion for forming a contour surface of at least the rod portion, among the contour surfaces which are parallel in a direction in which the upper and lower dies face each other;
the upper and lower dies each having formed therein: a forming surface including a rod-portion forming-section to form those side surfaces of the rod portion of the connecting rod blank which lie opposite to the upper and lower dies; a face surface lying opposite to the intermediate die; and an inclined surface on that outer peripheral edge portion of the rod-portion forming-section section which chamfers each of the corner portions in cross section of the rod portion of the connecting rod blank; wherein the intermediate die is supported through urging means in a manner floated from the face surface of the lower die such that, when the upper die is closed to the lower die, the face surface of the upper die gets seated on the intermediate die and thereafter that the intermediate die gets seated on the face surface of the lower die against the urging means.

* * * * *